(12) United States Patent
Fujisaki et al.

(10) Patent No.: US 11,010,174 B2
(45) Date of Patent: May 18, 2021

(54) INFORMATION PROCESSING APPARATUS, INFORMATION PROCESSING SYSTEM, AND INFORMATION PROCESSING METHOD

(71) Applicant: FUJITSU LIMITED, Kawasaki (JP)

(72) Inventors: Naoya Fujisaki, Yokohama (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 16/106,797

(22) Filed: Aug. 21, 2018

(65) Prior Publication Data

US 2018/0357069 A1 Dec. 13, 2018

Related U.S. Application Data

(63) Continuation of application No. PCT/JP2016/055989, filed on Feb. 29, 2016.

(51) Int. Cl.
*G06F 3/00* (2006.01)
*G06F 9/445* (2018.01)
*G06F 8/61* (2018.01)
*G06F 9/54* (2006.01)
*H04W 48/12* (2009.01)

(52) U.S. Cl.
CPC ............... *G06F 9/445* (2013.01); *G06F 8/61* (2013.01); *G06F 9/44505* (2013.01); *G06F 9/54* (2013.01); *H04W 48/12* (2013.01)

(58) Field of Classification Search
CPC ...................................................... G06F 9/541

USPC ..................................................... 719/318, 328
See application file for complete search history.

(56) References Cited

U.S. PATENT DOCUMENTS

| 6,493,719 | B1 * | 12/2002 | Booth | G06F 9/541 |
| 7,451,453 | B1 * | 11/2008 | Evans | G06F 9/542 |
| | | | | 386/248 |
| 8,260,320 | B2 | 9/2012 | Herz | |
| 2005/0172286 | A1 * | 8/2005 | Brumme | G06F 9/468 |
| | | | | 718/1 |

(Continued)

FOREIGN PATENT DOCUMENTS

JP 2003-304184 10/2003
JP 2008-186304 8/2008

(Continued)

OTHER PUBLICATIONS

Barth'el' emy Dagenais, Recovering Traceability Links between an API and Its Learning Resources. (Year: 2012).*

(Continued)

*Primary Examiner* — Lechi Truong
(74) *Attorney, Agent, or Firm* — Staas & Halsey LLP

(57) ABSTRACT

An information processing apparatus capable of performing wireless communication, includes a processor configured to execute one or more processes including receiving a beacon transmitted from a device, extracting, from the received beacon, called condition information indicating a condition by which a first program is called, and calling the first program in response to determining that a process, which the information processing apparatus is caused to execute by a second program, satisfies the condition indicated by the extracted called condition information.

13 Claims, 34 Drawing Sheets

(56) References Cited

U.S. PATENT DOCUMENTS

| | | |
|---|---|---|
| 2009/0150889 A1 | 6/2009 | Yamaguchi et al. |
| 2012/0095956 A1* | 4/2012 | Xiong ................. G06Q 10/067 707/600 |
| 2012/0270611 A1* | 10/2012 | Choi ................... H04L 12/1859 455/574 |
| 2013/0130651 A1 | 5/2013 | Deasy et al. |
| 2014/0237594 A1* | 8/2014 | Thakadu ................. G06F 21/52 726/23 |
| 2015/0127733 A1 | 5/2015 | Ding et al. |
| 2015/0193600 A1* | 7/2015 | Matsuda ............. H04L 63/0823 726/9 |
| 2016/0198323 A1 | 7/2016 | Sakamoto et al. |

FOREIGN PATENT DOCUMENTS

| | | |
|---|---|---|
| JP | 2015-508582 | 3/2015 |
| JP | 2015-527757 | 9/2015 |
| JP | 2016-126651 | 7/2016 |
| WO | WO 2007/132748 A1 | 11/2007 |

OTHER PUBLICATIONS

English abstract for International Publication No. WO 2013/078140 A1, published May 30, 2013 (Corresponds to Ref. AJ).
English abstract for International Publication No. WO 2013/169974 A1, published Nov. 14, 2013 (Corresponds to Ref. AK).
Patent Abstracts of Japan English abstract for Japanese Patent Publication No. 2016-126651, published Jul. 11, 2018.
Espacenet English abstract for Japanese Patent Publication No. 2008-186304, published Aug. 14, 2008.
Espacenet English abstract for Japanese Patent Publication No. 2003-304184, published Oct. 24, 2003.
International Search Report dated May 31, 2016 in corresponding International Patent Application No. PCT/JP2016/055989.

* cited by examiner

FIG.1A

```
startActivity(new Intent(com.compose.xxmail.Main));
```

FIG.1B

```
<intent-filter>
  <action aaaa:name="com.compose.xxmail.Main"/>
  <category aaaa:name="CATEGORY_APP_EMAIL"/>
</intent-filter>
```

FIG.2A startActivity(new Intent(<u>CATEGORY_APP_EMAIL</u>));

FIG.2B

```
<intent-filter>
<category aaaa:name="CATEGORY_APP_EMAIL"/>
</intent-filter>
```

FIG.2C

```
<intent-filter>
<action android:name="com.compose.email.Main"/>
<category android:name="CATEGORY_APP_EMAIL"/>
</intent-filter>
```

FIG.33A

| ID | REVERSE DOMAIN NAMESPACE | SPATIAL PROCESSING | SORTING METHOD |
|---|---|---|---|
| 1 | com.a-service.apps | WITHIN SPACE | RECEPTION |
| 2 | jp.b-service.apps | WITHIN SPACE | RECEPTION |

FIG.33B

| ID | REGULAR EXPRESSION | REGULAR EXPRESSION PROCESSING | SORTING METHOD |
|---|---|---|---|
| A | UUID=00000000-ABCD-1234-ABCD-01234??? | VALID | RECEPTION |
| B | SSID=B-SERVICE-* | VALID | RECEPTION |

FIG.33C

| ID | REVERSE DOMAIN NAMESPACE | SERVICE ID | COMBINING METHOD |
|---|---|---|---|
| (1) | 1 | A | LOGICAL MULTIPLICATION |
| (2) | 2 | B | LOGICAL ADDITION |

…
INFORMATION PROCESSING APPARATUS, INFORMATION PROCESSING SYSTEM, AND INFORMATION PROCESSING METHOD

CROSS-REFERENCE TO RELATED APPLICATION

This application is a U.S. continuation application filed under 35 USC 111(a) claiming benefit under 35 USC 120 and 365(c) of PCT Application PCT/JP2016/055989 filed on Feb. 29, 2016, the entire contents of which are incorporated herein by reference.

FIELD

The embodiments discussed herein are related to an information processing apparatus, an information processing system, and an information processing method.

BACKGROUND

In recent years, terminals capable of wireless communication (for example, smart terminals, etc.) are rapidly becoming widespread. With the popularization of such terminals, access points of wireless communication (hereinafter referred to as "wireless AP") are installed at various places. Examples of the wireless AP are a carrier base station (3G/4G), a spot wireless AP (Wi-Fi (registered trademark)), etc. Furthermore, in some devices such as a printer, a projector, a storage, an electronic bulletin board, a bathroom scale, etc., a wireless AP is installed. Furthermore, there are devices that are compatible with local radio (Bluetooth (registered trademark) Low Energy: BLE). Beacons transmitted by such various wireless APs and devices inundate towns, etc., throughout.

In the beacons, identification information is included as defined by BSID for base stations; SSID (Service Set Identifier), BSSID (Basic Service Set Identifier), or ESSID (Extended Service Set Identifier) for Wi-Fi (registered trademark); and UUID (Universally Unique Identifier) for BLE. These pieces of identification information are used for individual identification of devices that transmit beacons, identification of provided services, etc.

For example, a system has been devised in which content corresponding to identification information included in a beacon, is distributed to a terminal that has received the beacon (for example, refer to Patent Document 1).

Patent Document 1: U.S. Pat. No. 8,260,320
Patent Document 2: Japanese National Publication of International Patent Application No. 2015-527757
Patent Document 3: Japanese National Publication of International Patent Application No. 2015-508582

SUMMARY

According to an aspect of the embodiments, an information processing apparatus capable of performing wireless communication, includes a processor configured to execute one or more processes including receiving a beacon transmitted from a device, extracting, from the received beacon, called condition information indicating a condition by which a first program is called, and calling the first program in response to determining that a process, which the information processing apparatus is caused to execute by a second program, satisfies the condition indicated by the extracted called condition information.

BRIEF DESCRIPTION OF THE DRAWINGS

FIGS. 1A and 1B are diagrams for describing an explicit intent;

FIGS. 2A to 2C are diagrams for describing an implicit intent;

FIGS. 33A to 33C are diagrams illustrating configuration examples of reception policies.

DESCRIPTION OF EMBODIMENTS

Figure 3:
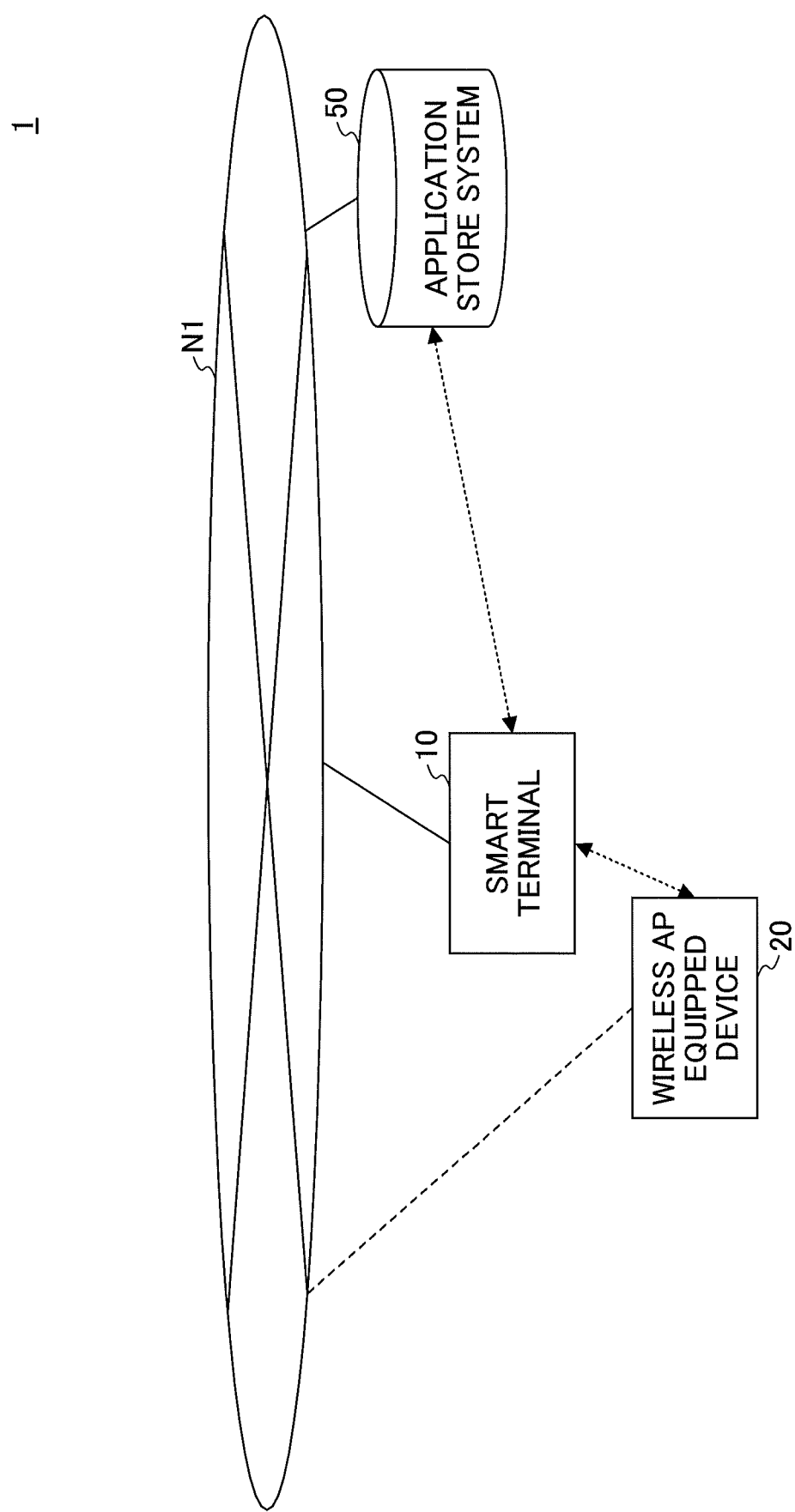
FIG. 3 is a diagram illustrating a configuration example of an information processing system according to a first embodiment.

In an environment where beacons of devices equipped with wireless APs such as printers, projectors, and storages, etc., are simultaneously propagating/travelling, a terminal catches all receivable beacons, and content not intended by the user may be distributed to the terminal.

First, resource binding information used in the present embodiment will be described.

Generally, manifest information is needed to execute an application in a smart terminal. The platform (OS (Operating System), etc.) of the smart terminal needs to manage the manifest information of the application before the application code is executed. The manifest information includes information indicating a condition for being called from another application (hereinafter referred to as "called resource binding information"), for example, in a text format. In the Android (registered trademark) platform, the Intent-Filter information corresponds to the called resource binding information. On the other hand, in the present embodiment, information indicating the condition of the application that is the calling target, held by the side that calls another application, is referred to as "calling resource binding information". In the Android (registered trademark) platform, the intent information corresponds to the calling resource binding information. For example, the intent information is described on the side calling another application, and intent filter information is described on the side of the called application. Note that when calling resource binding information and called resource binding information are not distinguished, these are referred to as "resource binding information".

As modes of calling another application, there are a direct calling mode and a candidate calling mode. The direct calling mode is a mode for clarifying the application to be called (the calling target) and directly calling the application. The candidate calling mode is a mode for specifying a condition for a candidate application to be a calling target, and calling one of the applications that match the condition. In the Android (registered trademark) platform, an explicit intent corresponds to the direct calling mode, and an implicit intent corresponds to the candidate calling mode. When there are a plurality of applications matching the condition, for example, these applications are reported to the user, and an application selected by the user is activated.

FIGS. 1A and 1B are diagrams for describing an explicit intent. FIG. 1A indicates intent information in which identification information (name) "com.compose.xxmail.Main" is explicitly specified as a condition of an application that is the calling target. In this case, as indicated in FIG. 1B, the application corresponding to the intent filter information including the name, is called. Note that in FIG. 1B, the character string "aaaa" is actually a character string "android (registered trademark)". This point is the same in FIGS. 2B and 2C.

On the other hand, FIGS. 2A to 2C are diagrams for describing an implicit intent. FIG. 2A indicates the intent information in which a condition (category) "CATEGORY_APP_EMAIL" is specified as a condition for the application that is the calling target. In this case, as indicated in FIG. 2B or 2C, the application corresponding to the intent filter information matching the condition (category) is the call candidate.

Note that in the calling resource binding information, the information of the part indicated in FIG. 1A or FIG. 2A (that is, information directly related to calling) is particularly referred to as "calling mode information". Furthermore, in the called resource binding information, the information of the part indicated in FIG. 1B and FIGS. 2B and 2C, etc., (that is, information directly related to being called) is particularly referred to as "called mode information".

The format and configuration, etc., of the manifest information (called resource binding information) varies depending on the platform (for example, Android (registered trademark) platform, iPhone (registered trademark) platform, Web platform, etc.); however, the manifest information on any platform generally includes the following information.
Name of application
Version information of application
End point information of application
Called mode information
Permission information of resource access
Build API version information The format and configuration, etc., of the calling resource binding information also varies depending on the platform. The calling resource binding information on the Android (registered trademark) platform is referred to as Intent; the calling resource binding information on the iPhone (registered trademark) platform is referred to as URL Schemes; and the calling resource binding information on the Web platform is referred to as Web-Activity or Web-Intents. The calling resource binding information is coded in the program for any of the platforms. Platforms other than the above also include information corresponding to calling resource binding information and called resource binding information.

In the following, the present embodiment will be described with the above as a prerequisite knowledge.

FIG. 3 is a diagram illustrating a configuration example of an information processing system according to a first embodiment. In FIG. 3, an information processing system 1 includes one or more smart terminals 10, one or more wireless AP equipped devices 20, and an application store system 50, etc.

The wireless AP equipped device 20 is a device equipped with an access point for wireless communication (hereinafter referred to as "wireless AP") such as Wi-Fi (registered trademark) or Bluetooth (registered trademark). Examples of the wireless AP equipped device 20 include a printer, a projector, a storage, an electronic bulletin board, a bathroom scale, or various home appliances, etc.

The smart terminal 10 is an information processing apparatus capable of wireless communication. For example, a smartphone and a tablet terminal, etc., may be used as the smart terminal 10.

The application store system 50 is a computer system that provides a service (hereinafter referred to as "application store service") for distributing various applications to the smart terminal 10. The smart terminal 10 can be connected to the application store system 50 via a wireless or wired network N1 and receive distribution of the application.

Note that the execution format of an application varies depending on the platform installed in the smart terminal 10. Therefore, each platform is associated with the application store system 50 in advance. The manufacturing company of the wireless AP equipped device 20 provides an application for using the device of the same company via wireless communication, from the application store system 50 for each platform.

Figure 4:
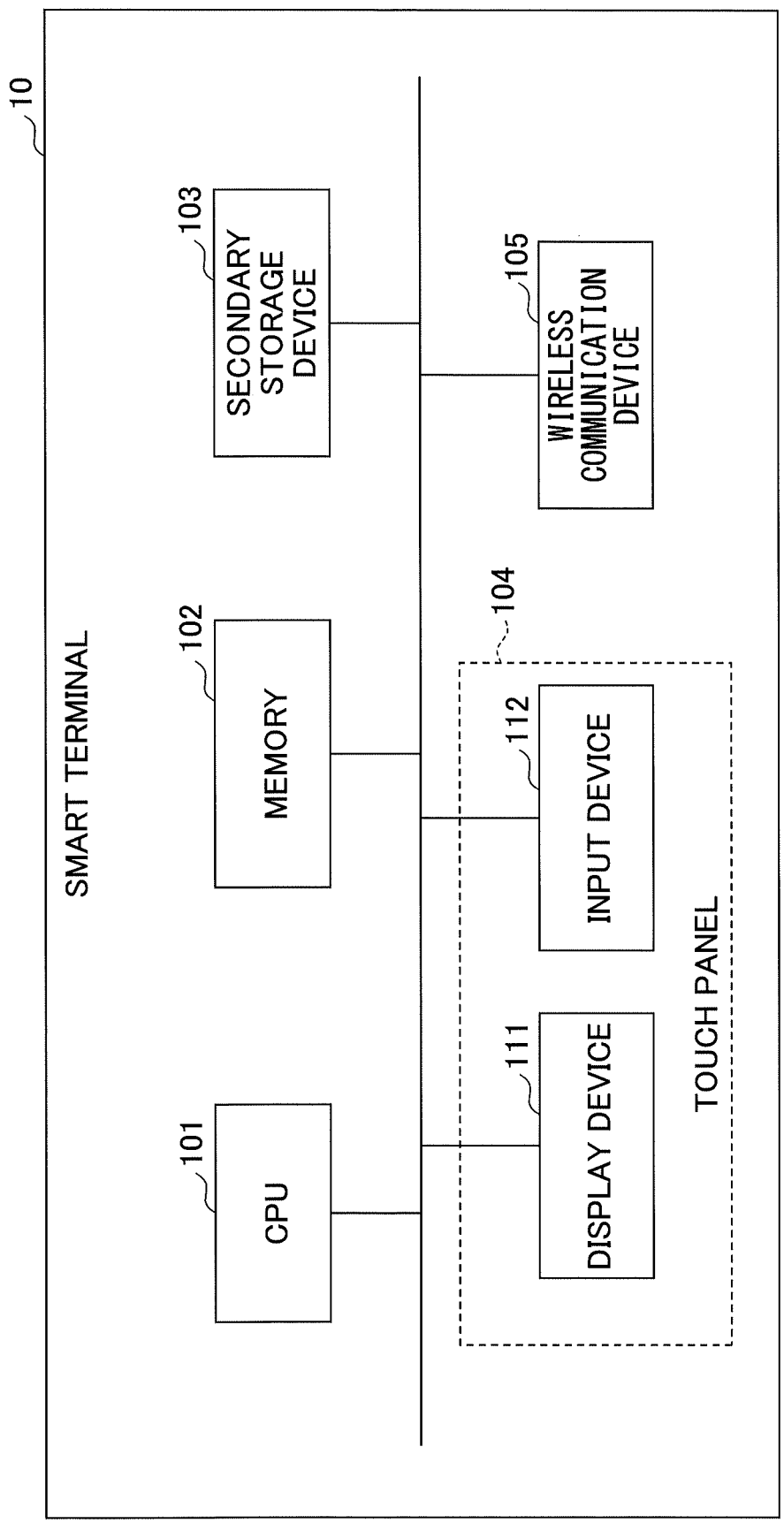
FIG. 4 is a diagram illustrating a hardware configuration example of a smart terminal according to the first embodiment.

FIG. 4 is a diagram illustrating a hardware configuration example of the smart terminal according to the first embodiment. In FIG. 4, the smart terminal 10 includes a CPU 101, a memory 102, a secondary storage device 103, a touch panel 104, and a wireless communication device 105, etc.

The secondary storage device 103 stores programs, etc., installed in the smart terminal 10. The memory 102 reads a program from the secondary storage device 103 and stores the program when an instruction to activate the program is issued. The CPU 101 implements functions of the smart terminal 10 according to programs stored in the memory 102.

The touch panel 104 is an electronic component having both an input function and a display function, and displays information and accepts input from a user, etc. The touch panel 104 includes a display device 111 and an input device 112, etc.

The display device 111 is a liquid crystal display, etc., and has the display function of the touch panel 104. The input device 112 is an electronic component including a sensor for detecting the contact of an object in contact with the display device 111. Note that that the contact object is an object that is in contact with the contact surface of the touch panel 104. An example of such an object is a finger of a user, an exclusive-use or general pen, etc. The wireless communication device 105 is an electronic component needed for performing wireless communication.

Note that the wireless AP equipped device 20 also includes a CPU and a memory, etc.

Figure 5:
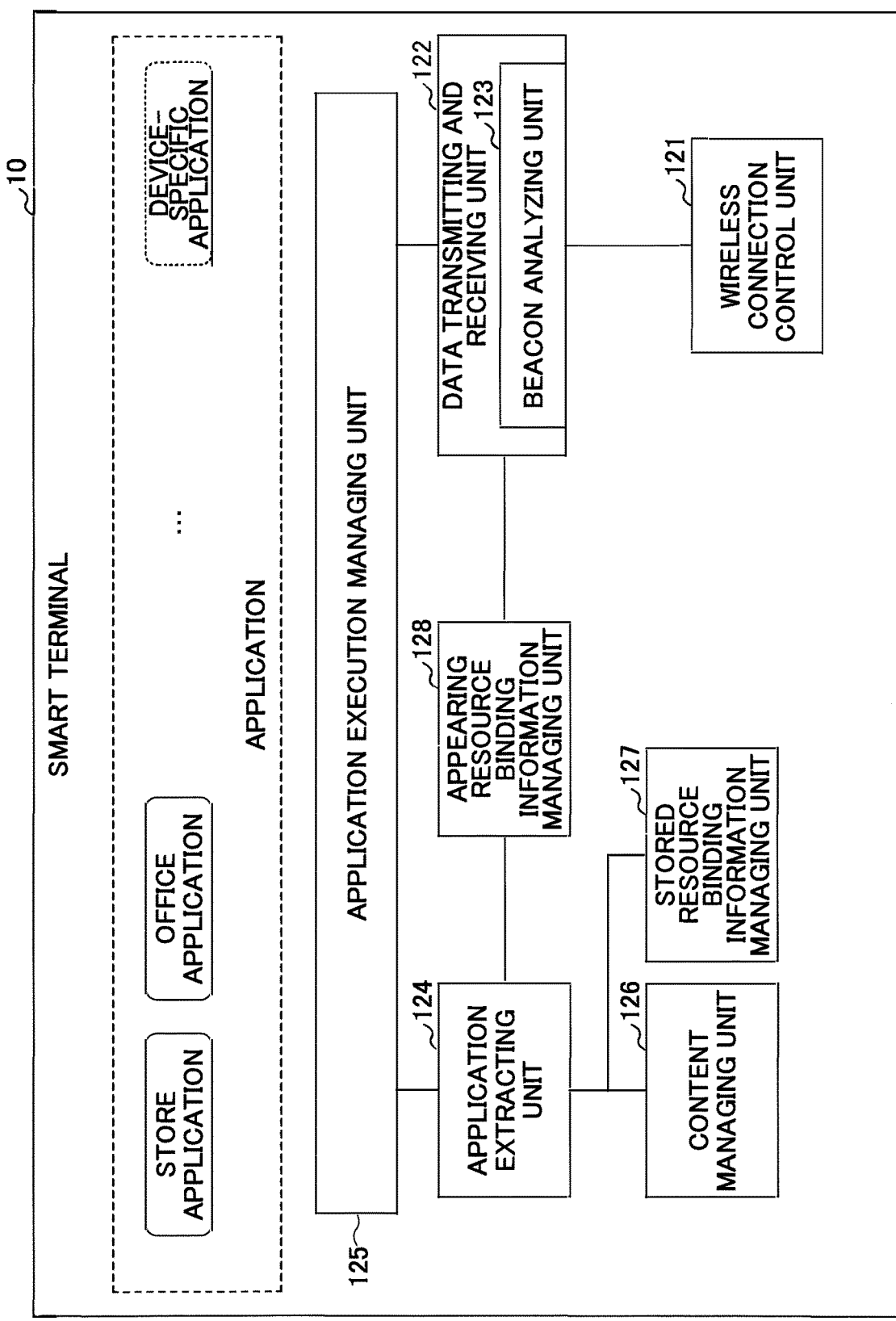
FIG. 5 is a diagram illustrating a functional configuration example of the smart terminal according to the first embodiment.

FIG. 5 is a diagram illustrating a functional configuration example of the smart terminal according to the first embodiment. As illustrated in FIG. 5, the smart terminal 10 includes a wireless connection control unit 121, a data transmitting and receiving unit 122, a beacon analyzing unit 123, an application extracting unit 124, an application execution managing unit 125, a content managing unit 126, a stored resource binding information managing unit 127, and an appearing resource binding information managing unit 128.

These units are implemented by processes that the CPU 101 is caused to execute by one or more programs installed in the smart terminal 10.

The stored resource binding information managing unit 127 manages the called resource binding information of each application installed in the smart terminal 10, for example, by using the secondary storage device 103.

The wireless connection control unit 121 controls wireless communication with the wireless AP equipped device 20, etc. The data transmitting and receiving unit 122 transmits and receives data via wireless communication.

The beacon analyzing unit 123 extracts the called resource binding information from the data frame of a beacon received by the data transmitting and receiving unit 122. The beacon analyzing unit 123 reports the extracted called resource binding information to the appearing resource binding information managing unit 128. The appearing resource binding information managing unit 128 stores and manages the reported called resource binding information, for example, in the secondary storage device 103.

The application extracting unit 124 acquires the called resource binding information that matches the condition indicated by the calling resource binding information transmitted from an active application via the stored resource binding information managing unit 127 and the appearing resource binding information managing unit 128. The application extracting unit 124 reports the acquired called resource binding information to the application execution managing unit 125.

The application execution managing unit 125 activates (calls) the application, etc. For example, the application execution managing unit 125 activates an application corresponding to the calling resource binding information transmitted from the active application, based on the called resource binding information reported from the application extracting unit 124.

The content managing unit 126 manages executable format files, etc., of each application installed in the smart terminal 10.

FIG. 5 also illustrates a store application, an office application, and a device-specific application, etc., as examples of an application installed in the smart terminal 10.

The store application is an application that provides an application store service to the user of the smart terminal 10 by communicating with the application store system 50. The office application is an application used for business in the workplace, such as applications relevant to word processing, spreadsheet, and presentation, etc. The device-specific application is an application that controls a specific one of the wireless AP equipped devices 20 via wireless communication.

Figure 6:
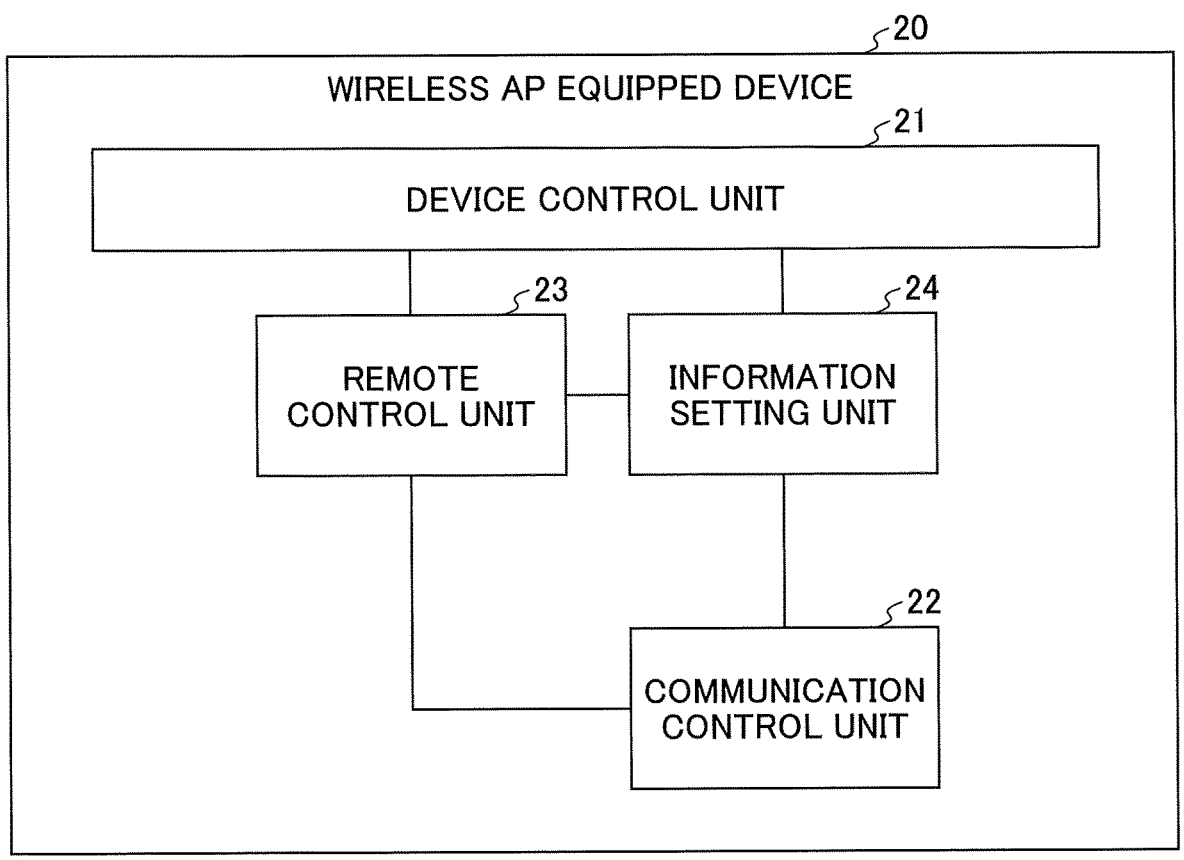
FIG. 6 is a diagram illustrating a functional configuration example of a wireless AP equipped device according to the first embodiment.

FIG. 6 is a diagram illustrating a functional configuration example of the wireless AP equipped device according to the first embodiment. In FIG. 6, the wireless AP equipped device 20 includes a device control unit 21, a communication control unit 22, a remote control unit 23, and an information setting unit 24, etc. These units are implemented by processes that the CPU of the wireless AP equipped device 20 is caused to execute by programs installed in the wireless AP equipped device 20.

The device control unit 21 controls the operations of the wireless AP equipped device 20. The remote control unit 23 executes a process according to a request, etc., received via wireless communication, etc. The communication control unit 22 controls the transmission of beacons and wireless communication, etc. The information setting unit 24 sets the called resource binding information regarding the wireless AP equipped device 20, in the data frame of a beacon.

Figure 7:
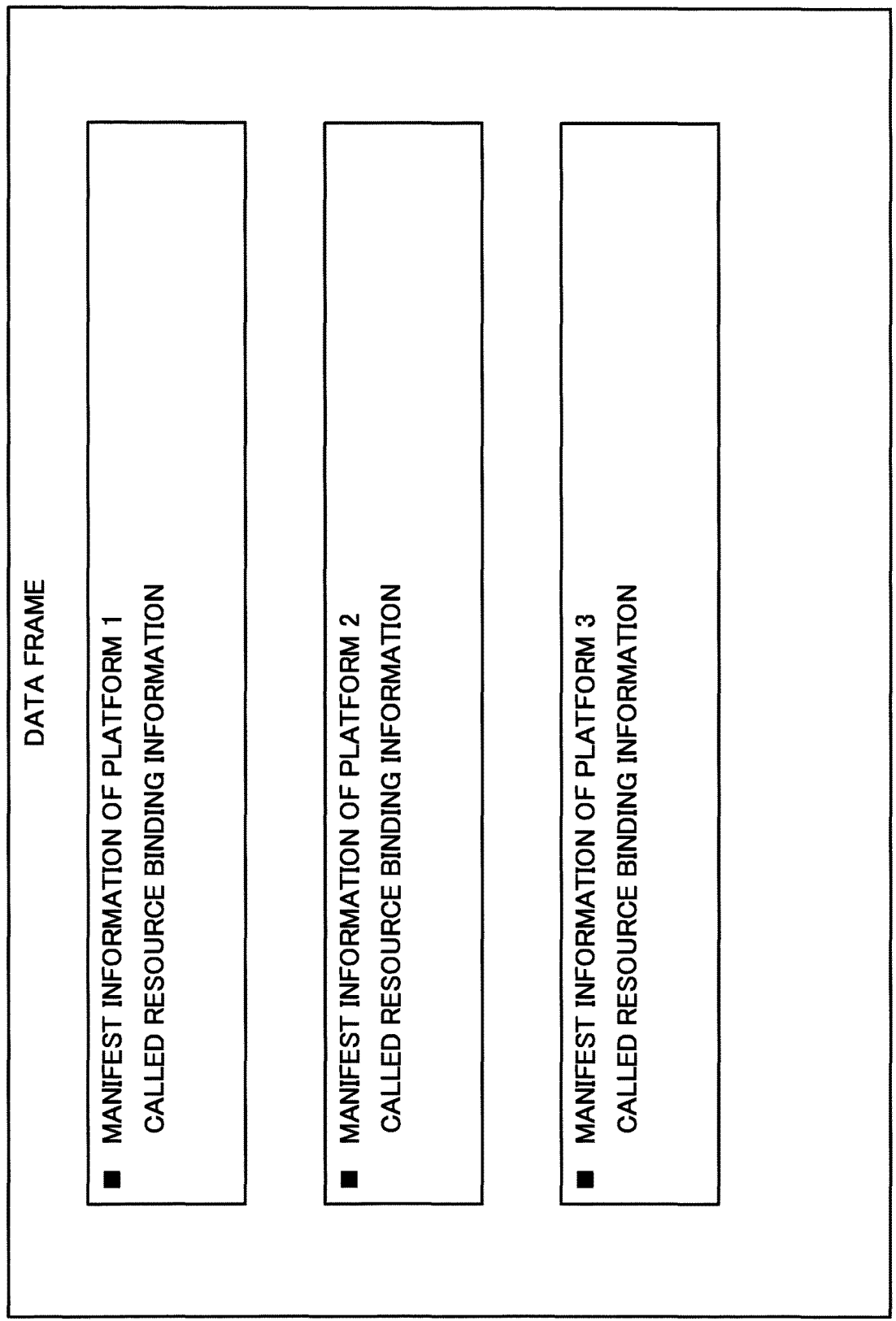
FIG. 7 is a diagram illustrating an example of information set in a data frame of a beacon according to the first embodiment.
Figure 8:
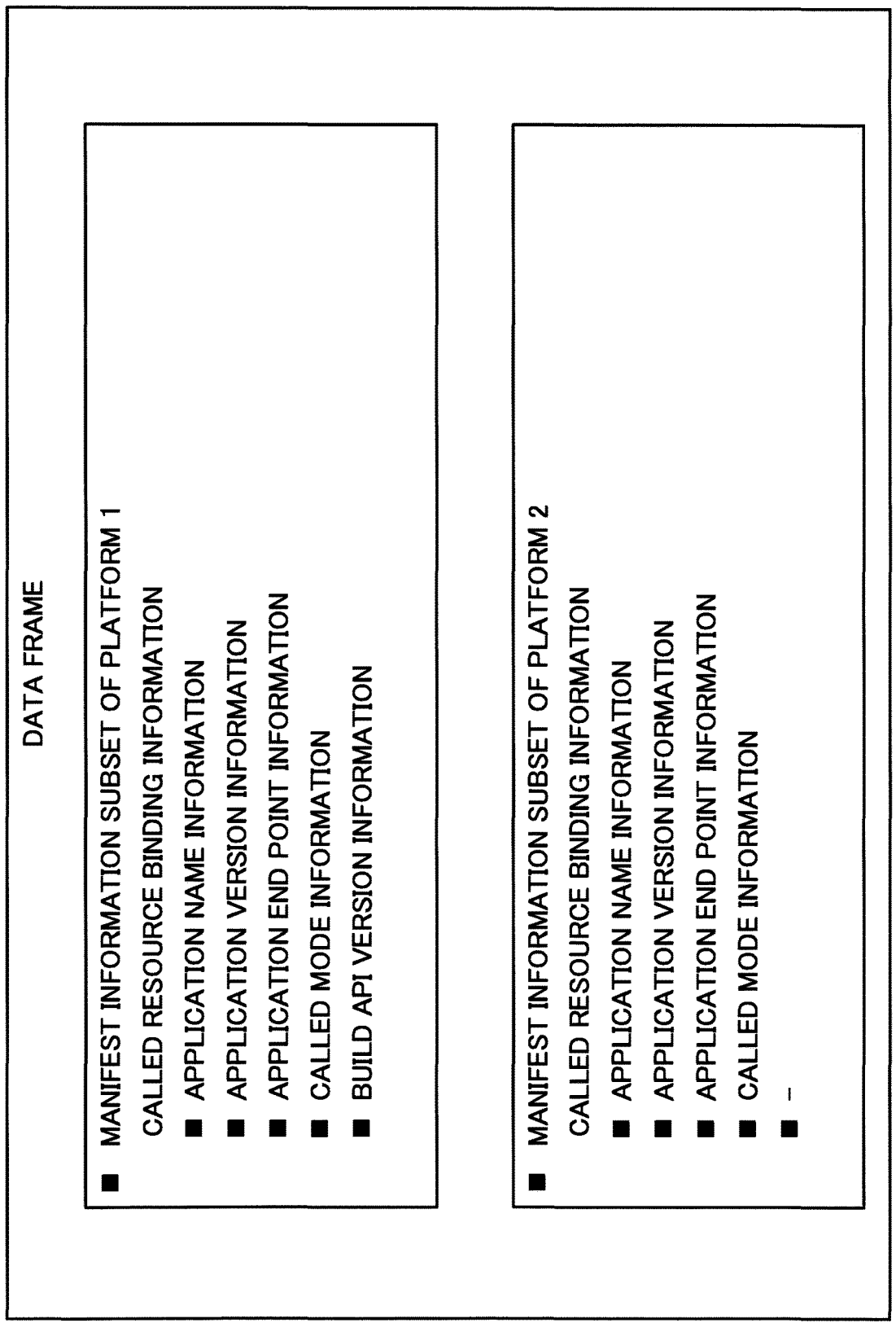
FIG. 8 is a diagram illustrating an example of information set in a data frame of a beacon according to the first embodiment.
Figure 9:
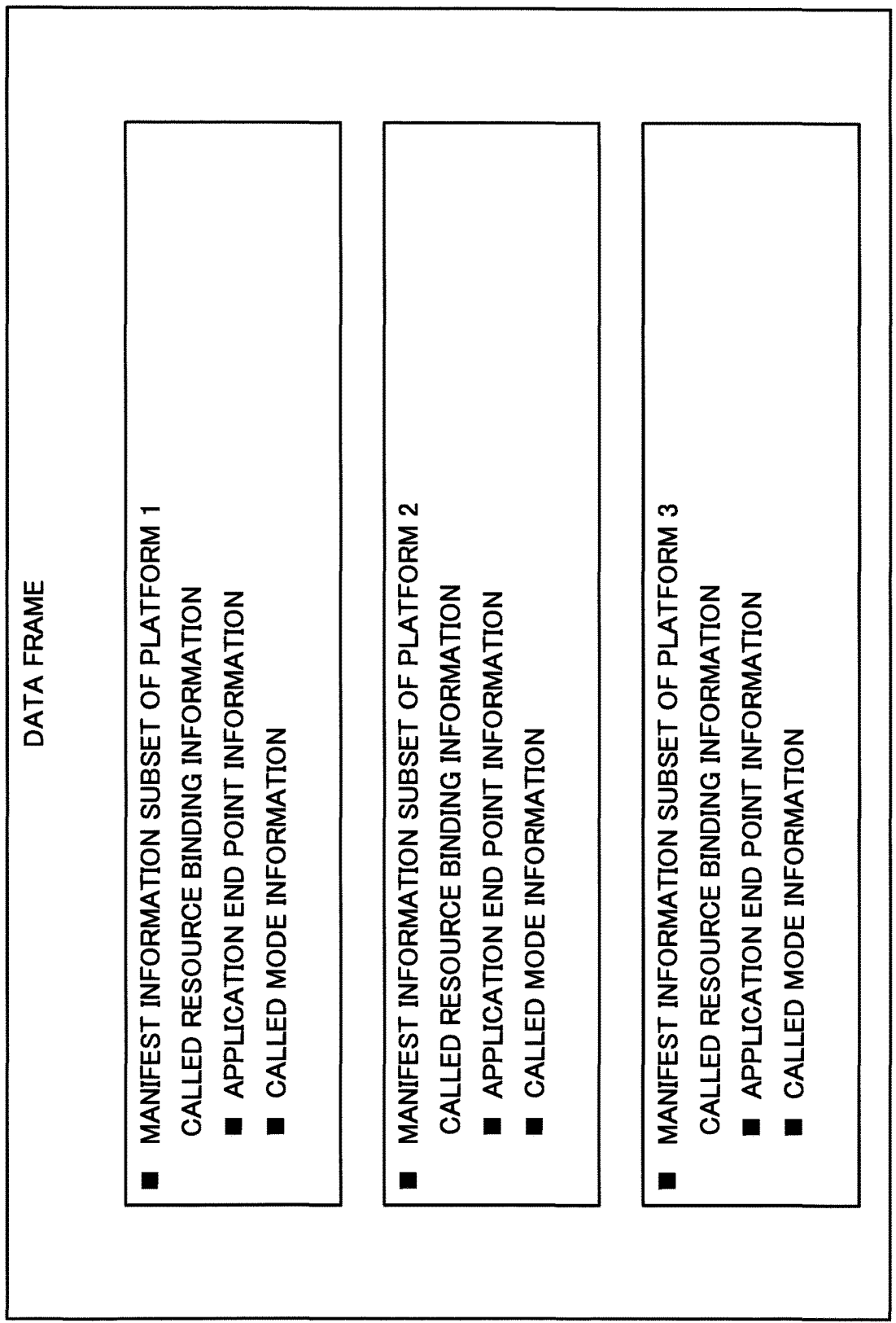
FIG. 9 is a diagram illustrating an example of information set in a data frame of a beacon according to the first embodiment.

FIGS. 7 to 9 are diagrams illustrating examples of information set in the data frame of a beacon according to the first embodiment.

FIG. 7 illustrates an example in which all of the pieces of manifest information for the respective one or more platforms are set in a single data frame. Each piece of manifest information includes called resource binding information.

FIG. 8 illustrates an example in which all of the pieces of called resource binding information, which are subsets of manifest information for the respective one or more platforms, are set in a single data frame. Furthermore, it is indicated that the configurations of the pieces of called resource binding information for the respective platforms do not have to be common.

FIG. 9 illustrates an example in which called mode information and application end point information, which are subsets of manifest information for the respective one or more platforms, are set in a single data frame.

Figure 10:
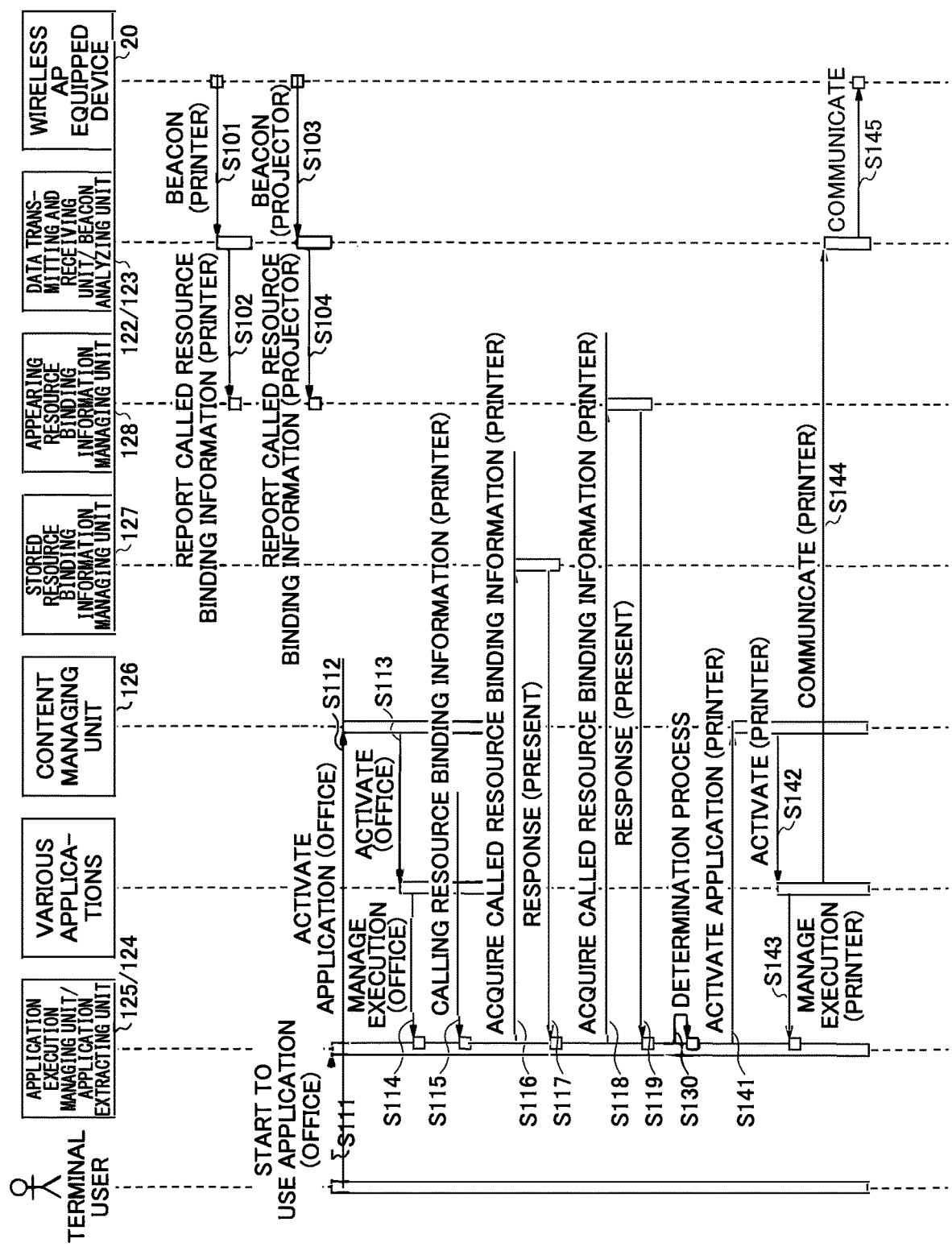
FIG. 10 is a sequence diagram for describing an example of a first processing procedure according to the first embodiment.

The processing procedure executed by the smart terminal 10 will be described below. FIG. 10 is a sequence diagram for describing an example of a first processing procedure according to the first embodiment.

It is assumed that the smart terminal 10 is located in an area where it is possible to detect beacons transmitted from both a printer device that is an example of the wireless AP equipped device 20 and a projector device that is an example of the wireless AP equipped device 20. Therefore, the data transmitting and receiving unit 122 of the smart terminal 10 receives a beacon from the printer device and a beacon from the projector device (steps S101 and S103). The beacon analyzing unit 123 extracts the called resource binding information corresponding to the platform of the smart terminal 10, from the data frames of the respective beacons that have been received, and reports the extracted called resource binding information to the appearing resource binding information managing unit 128 (steps S102 and S104). The appearing resource binding information managing unit 128 stores the reported called resource binding information, for example, in the memory 102 or the secondary storage device 103.

Figure 11A:
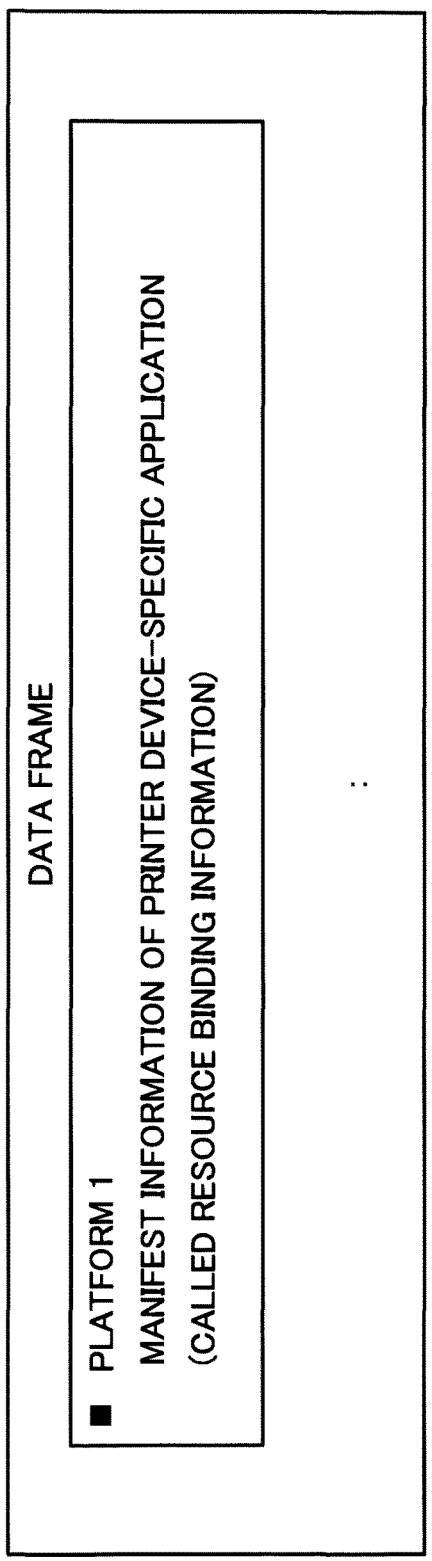
FIGS. 11A and 11B are diagrams respectively illustrating an example of a data frame of a beacon of a printer device and a data frame of a beacon of a projector device according to the first embodiment.
Figure 11B:
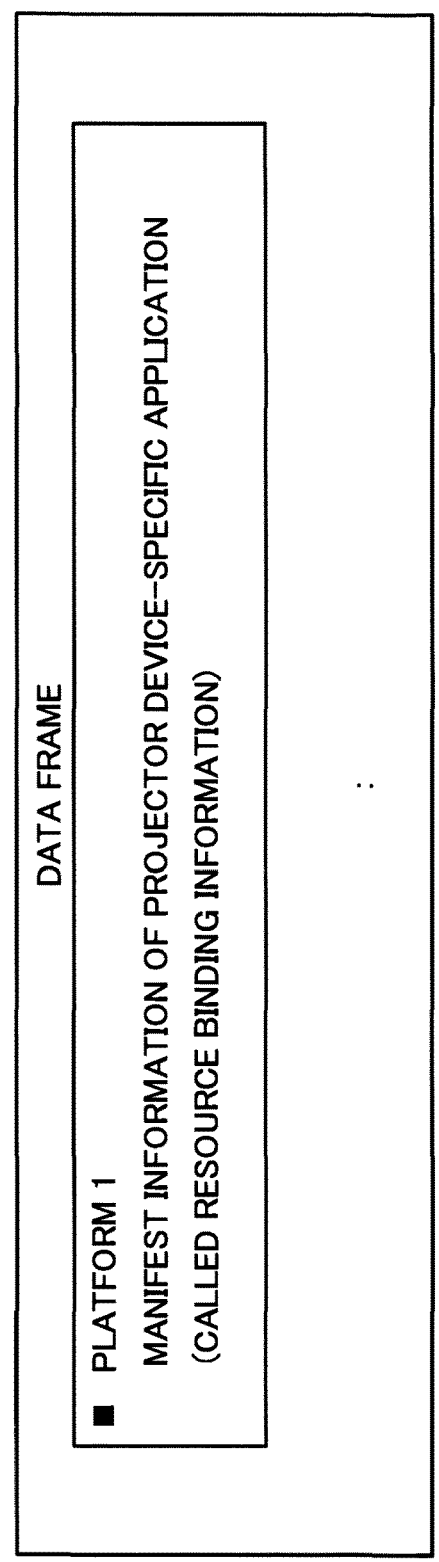

FIGS. 11A and 11B are diagrams respectively illustrating an example of a data frame of a beacon of a printer device and a data frame of a beacon of a projector device according to the first embodiment.

FIG. 11A illustrates an example of a data frame of a beacon of a printer device. In the data frame, manifest information (called resource binding information) of the application exclusively used for the printer device that is an example of the device-specific application, is included for each platform. FIG. 11B illustrates an example of a data frame of the beacon of the projector device. In the data frame, manifest information (called resource binding information) of the application exclusively used for the projector device that is an example of the device-specific application, is included for each platform.

On the other hand, when the user of the smart terminal 10 inputs an instruction to start using the office application to the smart terminal 10 (step S111), the application execution managing unit 125 requests the content managing unit 126 to activate the office application (step S112). The content managing unit 126 acquires the executable format file of the office application from the secondary storage device 103, and activates the office application (step S113). Subsequently, the application execution managing unit 125 manages the execution of the office application (step S114).

Subsequently, in response to a user's operation, etc., when the office application transmits the calling resource binding information for the printer device-specific application in order to output the information to the printer device (step S115), the application execution managing unit 125 reports the calling resource binding information to the application extracting unit 124.

The application extracting unit 124 attempts to acquire the called resource binding information corresponding to the calling resource binding information, from each of the stored resource binding information managing unit 127 and the appearing resource binding information managing unit 128 (steps S116 and S118). Here, it is assumed that corresponding called resource binding information can be acquired from both the stored resource binding information managing unit 127 and the appearing resource binding information managing unit 128 (steps S117 and S119). Note that the application extracting unit 124 may access only the stored resource binding information managing unit 127 or only the appearing resource binding information managing unit 128 according to the calling resource binding information reported from the application execution managing unit 125.

Subsequently, the application extracting unit 124 determines whether an application corresponding to the calling resource binding information is installed in the smart terminal 10, based on the acquisition result of the called resource binding information (step S130). In this case, the corresponding called resource binding information has also been acquired from the stored resource binding information managing unit 127, and therefore the application extracting unit 124 determines that the application has already been installed in the smart terminal 10.

Therefore, the application extracting unit 124 reports, to the application execution managing unit 125, the called resource binding information acquired from the stored resource binding information managing unit 127. The application execution managing unit 125 requests the content managing unit 126 to activate the printer device-specific application corresponding to the called resource binding information (step S141). The content managing unit 126 acquires the executable format file of the printer device-specific application from the secondary storage device 103, and activates the printer device-specific application (step S142). In this way, when the process that the smart terminal 10 is caused to execute by the office application satisfies the condition indicated by certain called resource binding information, the application relevant to the called resource binding information is activated.

Subsequently, the application execution managing unit 125 manages execution of the printer device-specific application (step S143). As a result, the application used by the user of the smart terminal 10 shifts from the office application to the printer device-specific application.

Subsequently, the activated printer device-specific application connects with the printer device and outputs the information, which is the processing target of the office application, to the printer device (steps S144 and S145).

Subsequently, a case where the printer device-specific application is not installed in the smart terminal 10, will be described.

Figure 12:
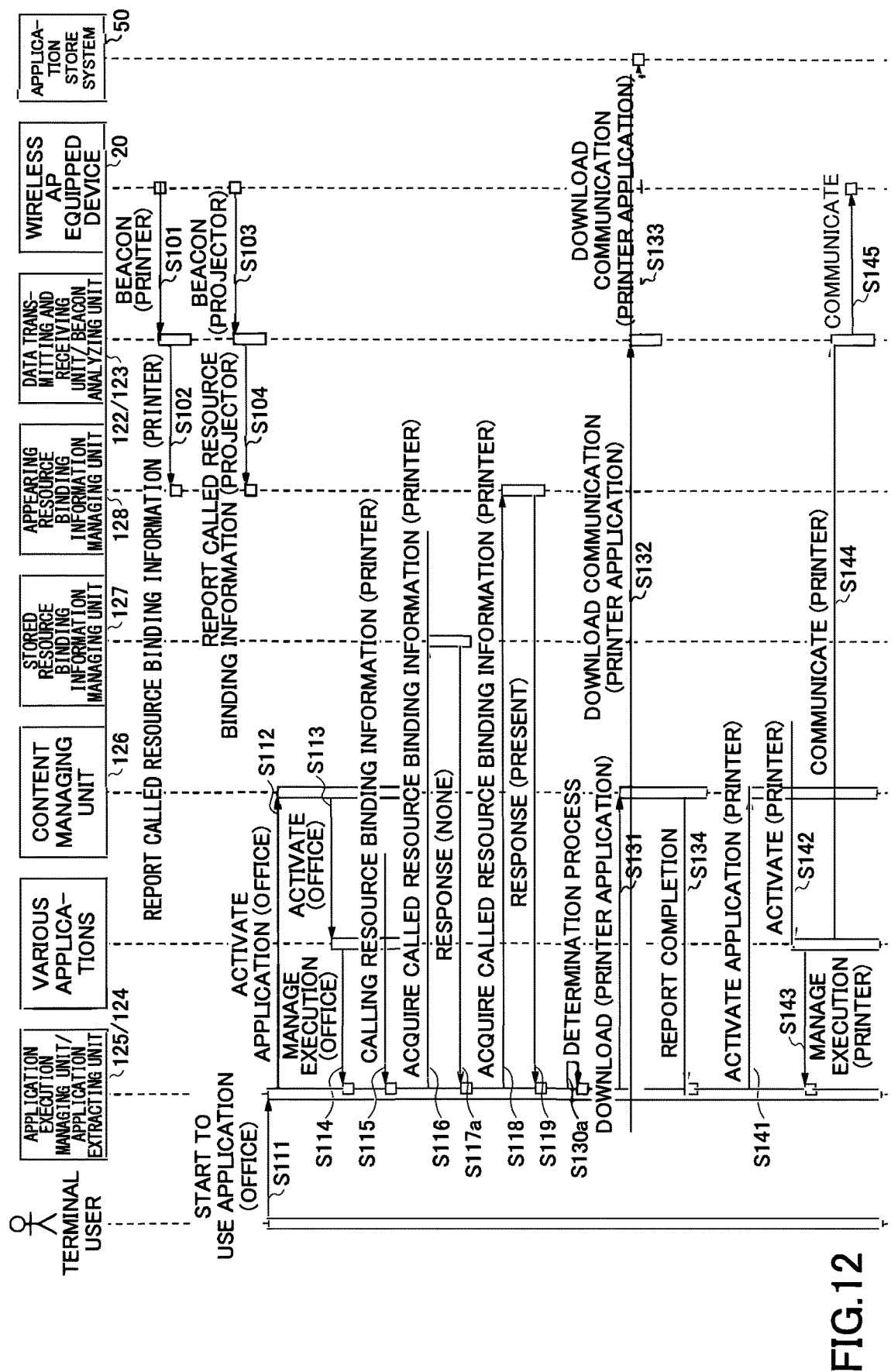
FIG. 12 is a sequence diagram for describing an example of a second processing procedure according to the first embodiment.

FIG. 12 is a sequence diagram for describing an example of a second processing procedure according to the first embodiment. In FIG. 12, the same steps as those in FIG. 10 are denoted by the same step numbers, and descriptions thereof are omitted.

FIG. 12 illustrates an example in which the called resource binding information corresponding to the calling resource binding information reported from the application execution managing unit 125 cannot be acquired from the stored resource binding information managing unit 127 (step S117a). On the other hand, the corresponding called resource binding information can be acquired from the appearing resource binding information managing unit 128 (step S119).

The application extracting unit 124 determines that an application corresponding to the calling resource binding information is not installed in the smart terminal 10, based on the acquisition result of the called resource binding information (step S130a).

Therefore, the application extracting unit 124 specifies the identification information (name, version information, etc.) of the printer device-specific application included in the called resource binding information acquired from the appearing resource binding information managing unit 128, and requests the content managing unit 126 to download the printer device-specific application (step S131). The content managing unit 126 accesses the application store system 50 associated with the platform of the smart terminal 10, and downloads the printer device-specific application (steps S132 and S133). The application store system 50 associated with the platform is, for example, the application store system 50 whose address information (URL) is described in advance in the source code of the platform. However, the address information may be stored in the secondary storage device 103, etc., separately from the source code of the platform.

At this time, the content managing unit 126 may request the user for permission to download the printer device-specific application. Furthermore, in step S119, when a plurality of pieces of the called resource binding information are acquired, the application corresponding to each of the pieces of the called resource binding information may be presented to the user via a store application, and the download target may be selected by the user. For example, when beacons from printer devices of a plurality of models have been detected, and the calling resource binding information transmitted from the office application follows candidate calling mode, a plurality of pieces of called resource binding information may be acquired. Furthermore, called resource binding information of a plurality of types of printer device-specific applications having different function levels, may be included in a beacon from one printer device.

The content managing unit 126 installs the downloaded printer device-specific application in the smart terminal 10. As a result, the executable format file of the printer device-specific application is managed by the content managing unit 126. Furthermore, the called resource binding information of the printer device-specific application is reported to the stored resource binding information managing unit 127, and is managed by the stored resource binding information managing unit 127.

When the installation is completed, the content managing unit 126 reports the completion of the installation to the application extracting unit 124 (step S134). Subsequently, step S141 and beyond are executed.

As described above, according to the first embodiment, the beacon from the wireless AP equipped device includes the called resource binding information for an application that can control the wireless AP equipped device 20, and the smart terminal 10 extracts and manages the called resource binding information. Then, the called resource binding information corresponding to the calling resource binding information from the application (in this case, the office application) used in the smart terminal 10, is extracted, and an application corresponding to the called resource binding information is activated.

Therefore, in the area where the beacons of the wireless AP equipped device 20 are transmitted, even if the user does not know the existence of the wireless AP equipped device 20 in the surrounding area, according to the context of the user (operation of the office application, etc.), the smart terminal 10 of the user can use the wireless AP equipped device 20 when the device is needed. As a result, it is possible to suppress the distribution of unnecessary content (for example, unintended by the user) to the smart terminal 10.

More specifically, according to the present embodiment, even when a user is positioned in a certain area for the first time, and even when the user is unaware of the association between the SSID included in each beacon transmitted in the area and the wireless AP equipped device 20, the user can use the wireless AP equipped device 20 that is transmitting the beacon. That is, without the user considering the wireless AP equipped device 20, at a timing when the application used by the user needs to cooperate with the printer, the printer device-specific application becomes the activation target. At this time, if the printer device-specific application is not installed in the smart terminal 10, installation is automatically performed. Therefore, the information of the office application can be output to the printer device without the user performing a special operation.

Next, a second embodiment will be described. In the second embodiment, the points different from the first embodiment will be described. In the second embodiment, the points that are not mentioned in particular may be the same as those in the first embodiment.

Figure 13:
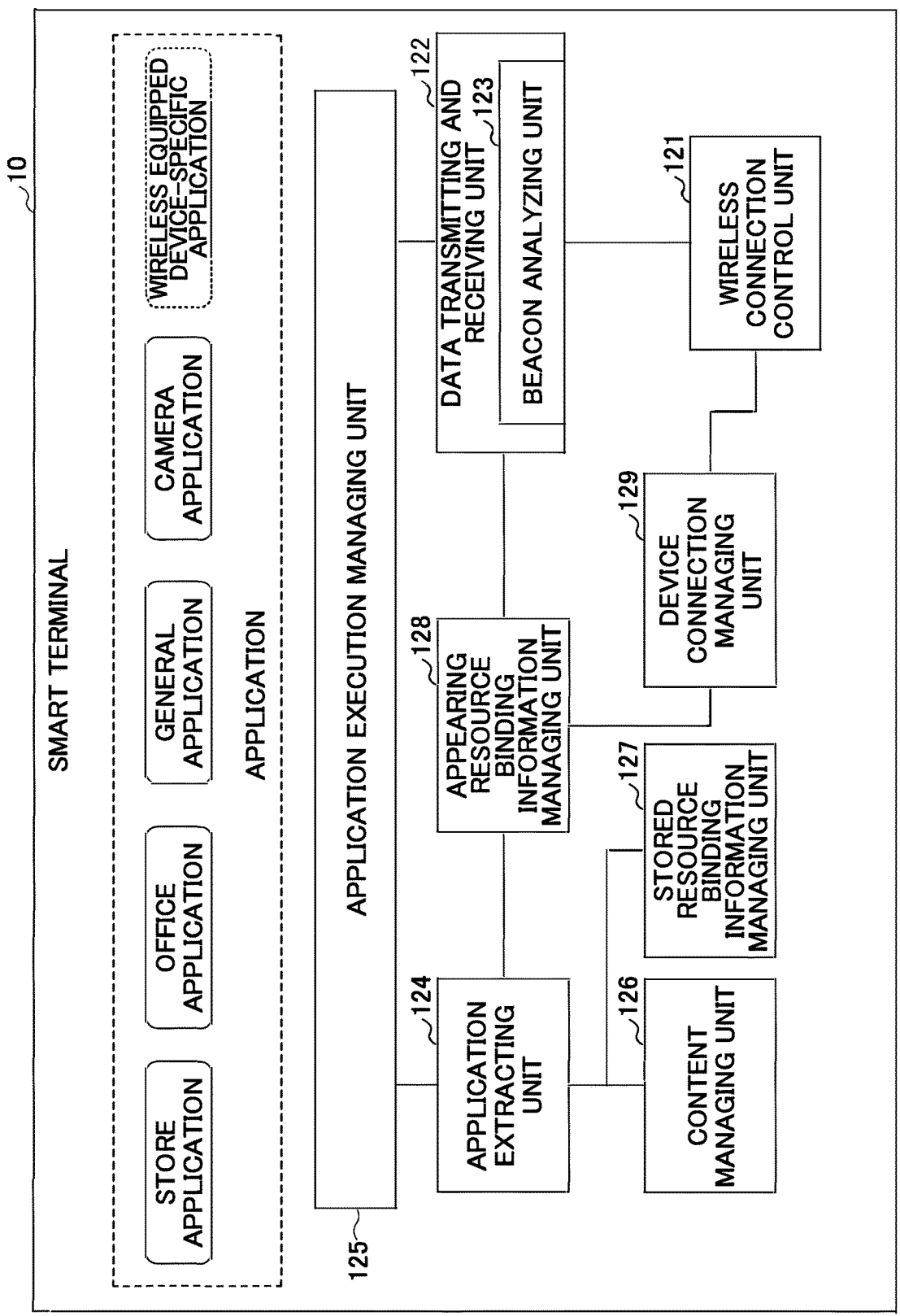
FIG. 13 is a diagram illustrating a functional configuration example of the smart terminal according to a second embodiment.

FIG. 13 is a diagram illustrating a functional configuration example of the smart terminal according to the second embodiment. In FIG. 13, the same elements as those in FIG. 5 are denoted by the same reference numerals, and descriptions thereof are omitted.

In FIG. 13, the smart terminal 10 further includes a device connection managing unit 129. The device connection managing unit 129 is implemented by processes that the CPU 101 is caused to execute by programs installed in the smart terminal 10.

The device connection managing unit 129 monitors the communication state of the device-specific application that has started communication with the wireless AP equipped device 20. Upon detecting that the communication of the device-specific application has ended, the device connection managing unit 129 requests the application execution managing unit 125 to stop the execution of the device-specific application, and reports the termination of the communication to the data transmitting and receiving unit 122.

Figure 14:
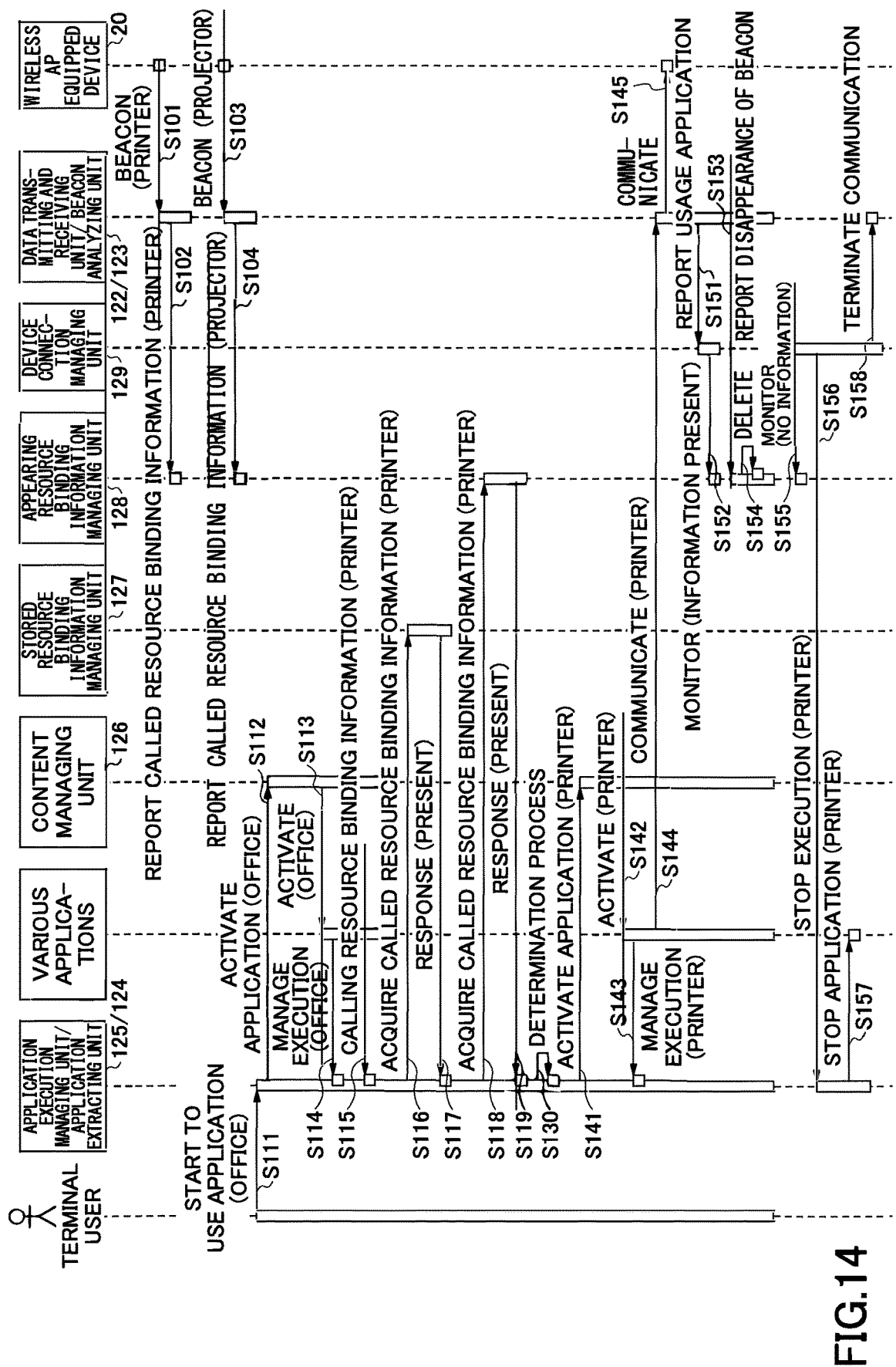
FIG. 14 is a sequence diagram for describing an example of a processing procedure according to the second embodiment.

FIG. 14 is a sequence diagram for describing an example of the processing procedure according to the second embodiment. In FIG. 14, the same steps as those in FIG. 10 are denoted by the same step numbers, and the descriptions thereof are omitted.

For example, when the printer device-specific application starts to communicate with the printer device, the data transmitting and receiving unit 122 mediating the communication recognizes the printer device-specific application, and reports the identification information of the printer device-specific application to the device connection managing unit 129 (step S151).

The device connection managing unit 129 periodically monitors the appearing resource binding information managing unit 128 to confirm whether the printer device-specific application is performing wireless communication. Specifically, the device connection managing unit 129 periodically sends a query to the appearing resource binding information managing unit 128 about the presence/absence of called resource binding information including the identification information reported from the data transmitting and receiving unit 122. When the called resource binding information is managed by the appearing resource binding information managing unit 128 (step S152), the device connection managing unit 129 determines that the printer device-specific application is performing wireless communication.

On the other hand, for example, when any one of the beacons that have been received is no longer received due to the movement of the smart terminal 10, the data transmitting and receiving unit 122 specifies the called resource binding information that has been included in the beacons so far, and reports to the appearing resource binding information managing unit 128 that the beacons are no longer received (step S153). The appearing resource binding information managing unit 128 deletes the called resource binding information from the memory 102 or the secondary storage device 103 (step S154). That is, the called resource binding information is excluded from the management targets.

When the device connection managing unit 129 detects that the called resource binding information including the identification information reported from the data transmitting and receiving unit 122 is excluded from the management targets of the appearing resource binding information managing unit 128 (step S155), the device connection managing unit 129 requests the application execution managing unit 125 to stop the execution of the printer device-specific application relevant to the identification information (step S156). In response to the request, the application execution managing unit 125 stops the execution of the printer device-specific application (step S157). The device connection managing unit 129 also reports the termination of communication regarding the device-specific application, to the data transmitting and receiving unit 122 (step S158). As a result, the data transmitting and receiving unit 122 releases the resources used for the communication.

As described above, according to the second embodiment, the device-specific application corresponding to the wireless AP equipped device 20 that can no longer perform wireless communication, is automatically stopped. Furthermore, the resources used for communication of the device-specific application are automatically released. As a result, power saving of the smart terminal 10 can be expected.

Next, a third embodiment will be described. In the third embodiment, the points different from the first embodiment will be described. In the third embodiment, the points that are not mentioned in particular may be the same as those in the first embodiment.

Figure 15:
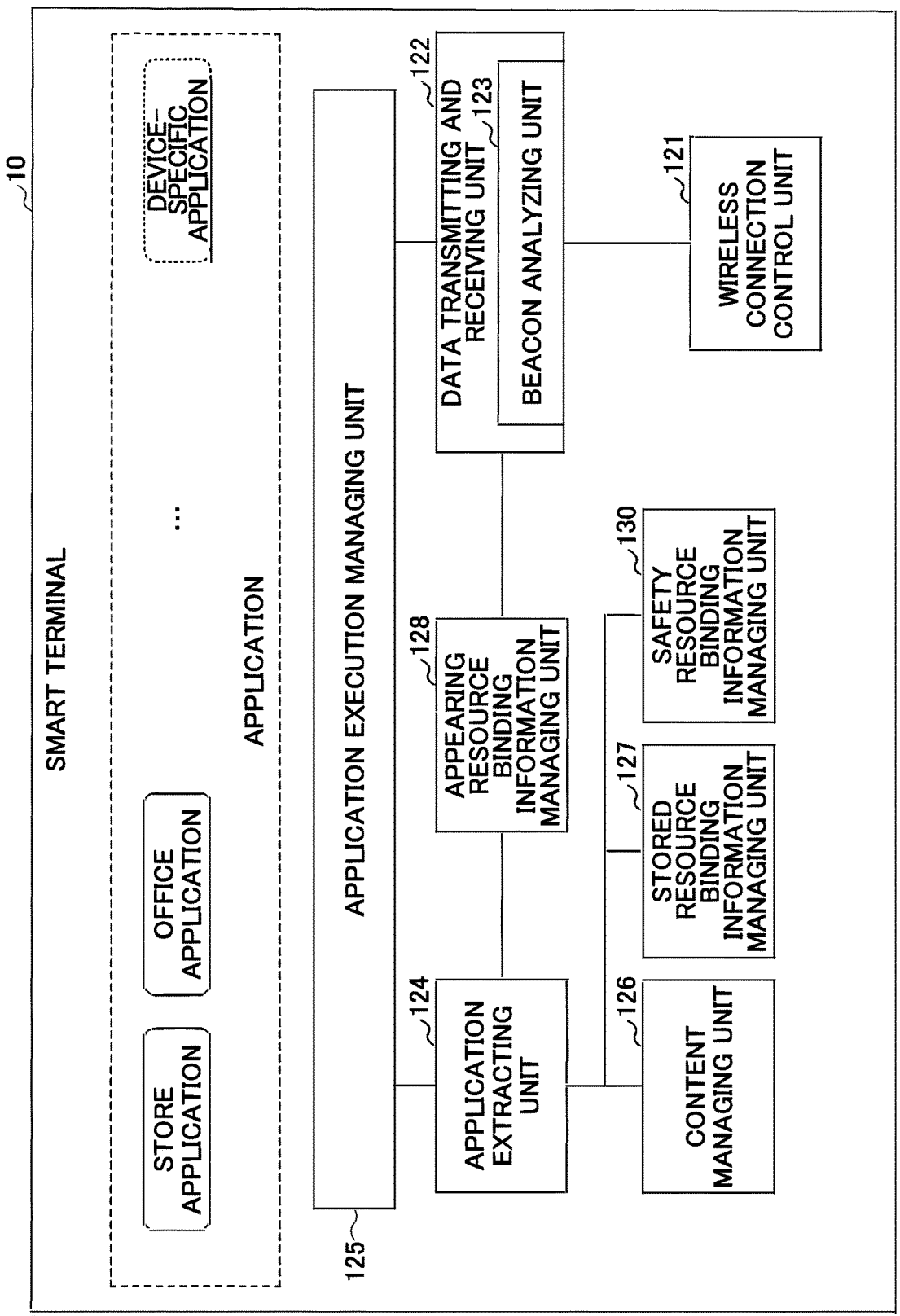
FIG. 15 is a diagram illustrating a functional configuration example of the smart terminal according to a third embodiment.

FIG. 15 is a diagram illustrating a functional configuration example of the smart terminal according to the third embodiment. In FIG. 15, the same elements as those in FIG. 5 are denoted by the same reference numerals, and descriptions thereof are omitted.

In FIG. 15, the smart terminal 10 further includes a safety resource binding information managing unit 130. The safety resource binding information managing unit 130 is implemented by processes that the CPU 101 is caused to execute by programs installed in the smart terminal 10.

The safety resource binding information managing unit 130 manages a set of identification information (hereinafter referred to as "device ID") of the wireless AP equipped device 20 whose safety is confirmed and called resource binding information of a device-specific application corresponding to the wireless AP equipped device 20, for example, by using the secondary storage device 103.

Figure 16:
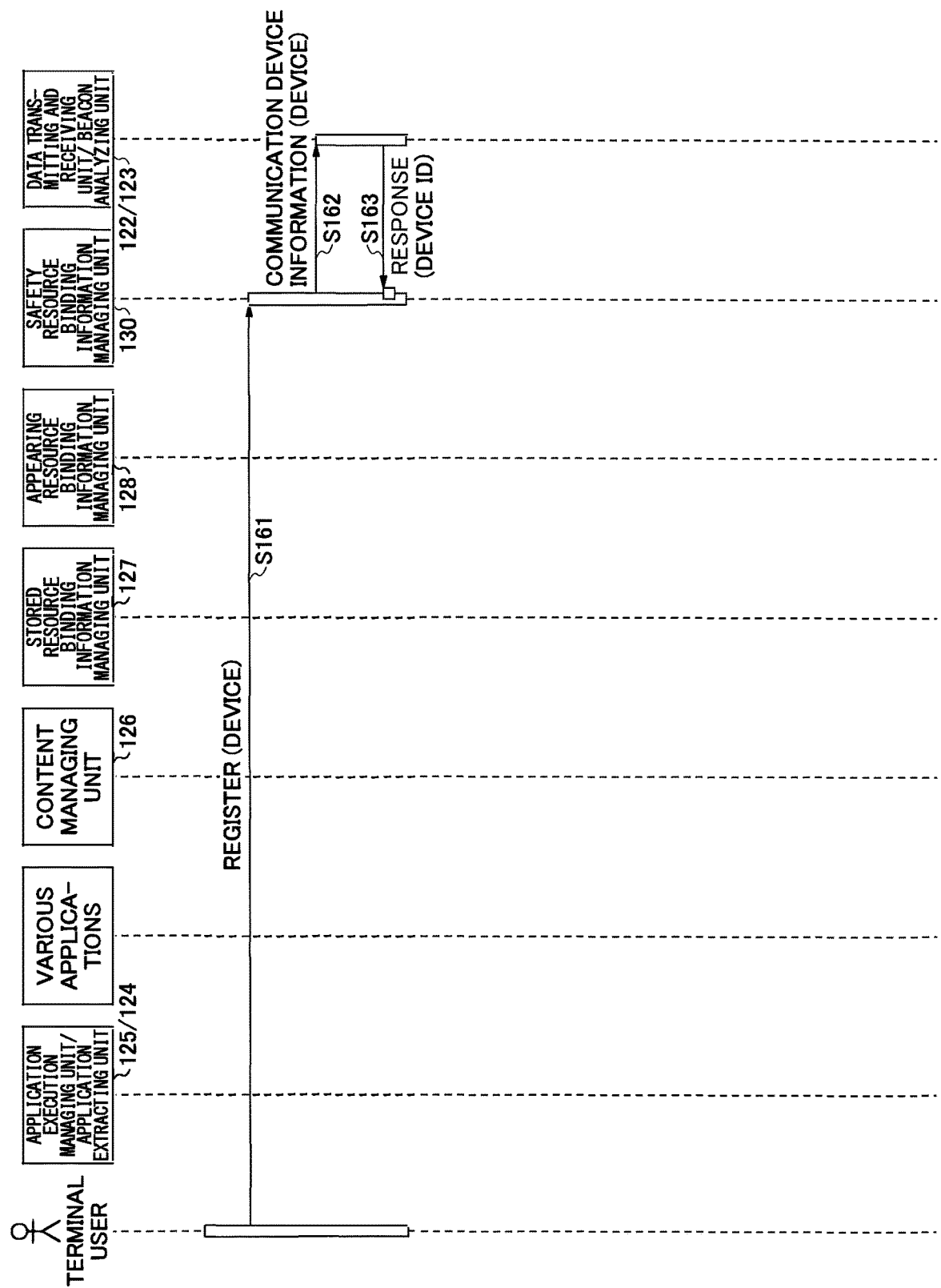
FIG. 16 is a sequence diagram for describing an example of a first processing procedure according to the third embodiment.

FIG. 16 is a sequence diagram for describing an example of a first processing procedure according to the third embodiment. In FIG. 16, for example, the processing procedure executed following step S145 of FIG. 10 is illustrated. That is, at the start of the processing procedure of FIG. 16, it is assumed that communication between the printer device-specific application and the printer device is being performed.

When an instruction to register a printer device is input to the smart terminal 10 by a predetermined operation by a user who has determined that the printer device presently communicating with the smart terminal 10 is safe (step S161), the safety resource binding information managing unit 130 requests the data transmitting and receiving unit 122 to register information regarding the presently communicating printer device (step S162). The data transmitting and receiving unit 122 reports the set of the device ID of the printer device and the called resource binding information included in the beacon received from the printer device, to the safety resource binding information managing unit 130 (step S163). Examples of a device ID include BSID, SSID (Service Set Identifier), UUID (Universally Unique Identifier), etc. These types of identification information can be extracted from a beacon, etc. The safety resource binding information managing unit 130 stores the device ID and the called resource binding information in association with each other, for example, in the secondary storage device 103.

Note that in the above description, an example in which the registration to the safety resource binding information managing unit 130 is executed during the communication with the wireless AP equipped device 20 is described. However, for example, the communication history may be stored, and by making a selection from the communication history, registration to the safety resource binding information managing unit 130 may be performed.

Figure 17:
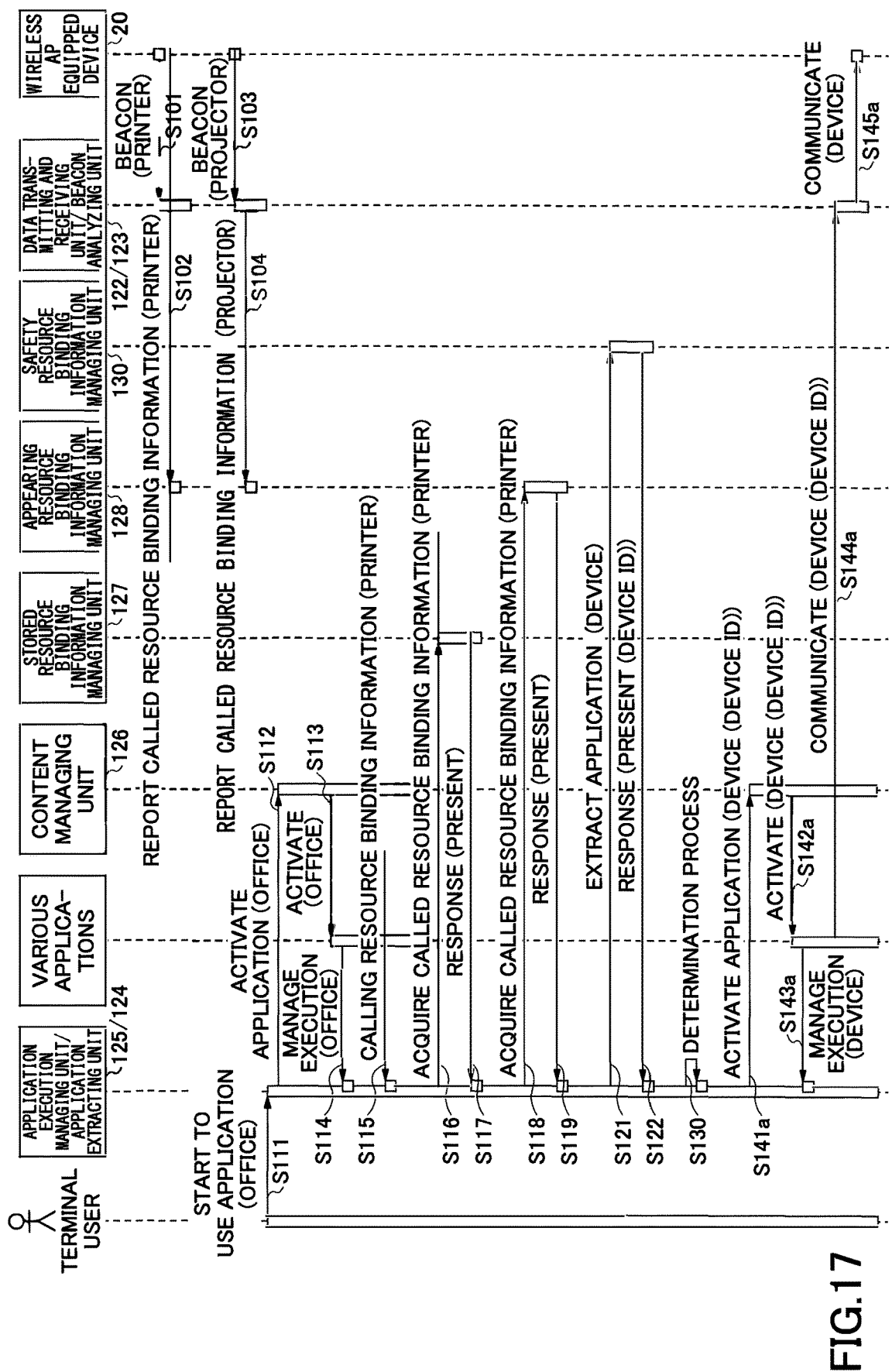
FIG. 17 is a sequence diagram for describing an example of a second processing procedure according to the third embodiment.

FIG. 17 is a sequence diagram for describing an example of a second processing procedure according to the third embodiment. In FIG. 17, the same steps as those in FIG. 10 are denoted by the same step numbers, and descriptions thereof are omitted. In FIG. 17, it is assumed that the user (the smart terminal 10) enters again the area where the user has been present at the time of execution of FIG. 16, after the execution of FIG. 16.

Following step S119, the application extracting unit 124 acquires a set of called resource binding information and a device ID corresponding to the calling resource binding information reported from the application execution managing unit 125, from the safety resource binding information managing unit 130 (steps S121 and S122).

Subsequently, the application extracting unit 124 executes step S130. Here, when a plurality of pieces of called resource binding information have been acquired in steps S116 to S122, the called resource binding information associated with the device ID acquired in step S122 may be preferentially selected.

Subsequently, the application extracting unit 124 reports the selected called resource binding information to the application execution managing unit 125. At this time, the device ID associated with the called resource binding information acquired in step S122 is reported. The application execution managing unit 125 specifies the device ID, and requests the content managing unit 126 to activate the printer device-specific application corresponding to the called resource binding information (step S141a). The content managing unit 126 acquires the executable format file of the printer device-specific application from the secondary storage device 103, and activates the printer device-specific application (step S142*a*). At this time, the content managing unit 126 reports the reported device ID to the printer device-specific application to be activated. Subsequently, the application execution managing unit 125 manages execution of the printer device-specific application (step S143*a*). As a result, the application used by the user of the smart terminal 10 shifts from the office application to the printer device-specific application.

The activated printer device-specific application connects with the printer device relevant to the reported device ID, and outputs the information, which is the processing target of the office application, to the printer device (steps S144*a* and S145*a*). That is, a printer device whose safety has been confirmed by the user in the past, is preferentially selected as a usage target.

As described above, according to the third embodiment, it is possible to preferentially use the wireless AP equipped device 20 having high safety.

Next, a fourth embodiment will be described. In the fourth embodiment, the points different from the first embodiment will be described. In the fourth embodiment, the points not mentioned in particular may be the same as those in the first embodiment.

Figure 18:
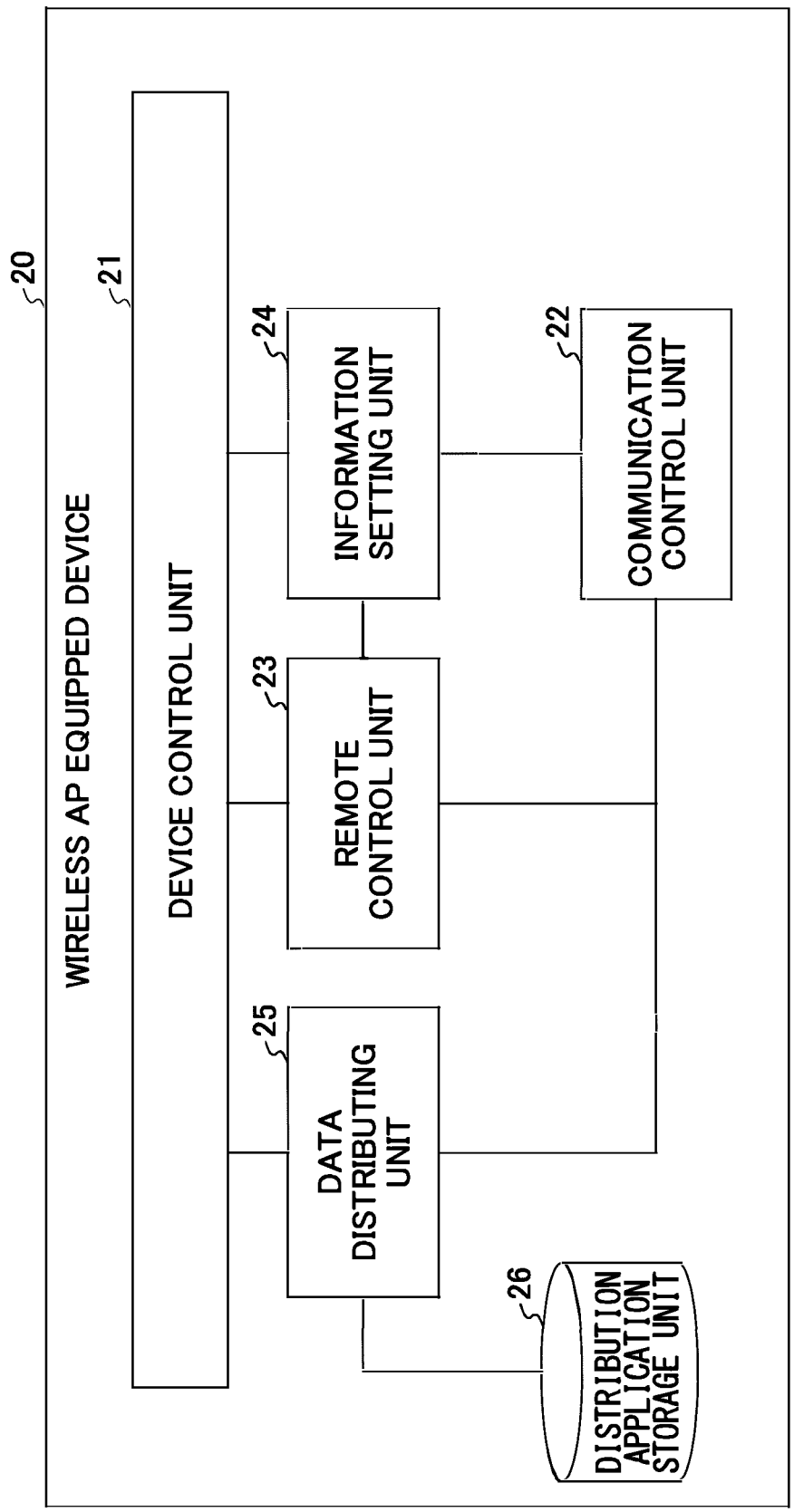
FIG. 18 is a diagram illustrating a functional configuration example of the wireless AP equipped device according to a fourth embodiment.

FIG. 18 is a diagram illustrating a functional configuration example of the wireless AP equipped device according to the fourth embodiment. In FIG. 18, the same elements as those in FIG. 6 are denoted by the same reference numerals, and descriptions thereof are omitted.

In FIG. 18, the wireless AP equipped device 20 further includes a data distributing unit 25 and a distribution application storage unit 26.

The data distributing unit 25 provides services of distributing applications and contents. The distribution application storage unit 26 stores applications or contents to be distributed. For example, device-specific applications and contents, etc., for causing the smart terminal 10 to use the wireless AP equipped device 20, are stored in the distribution application storage unit 26.

Figure 19:
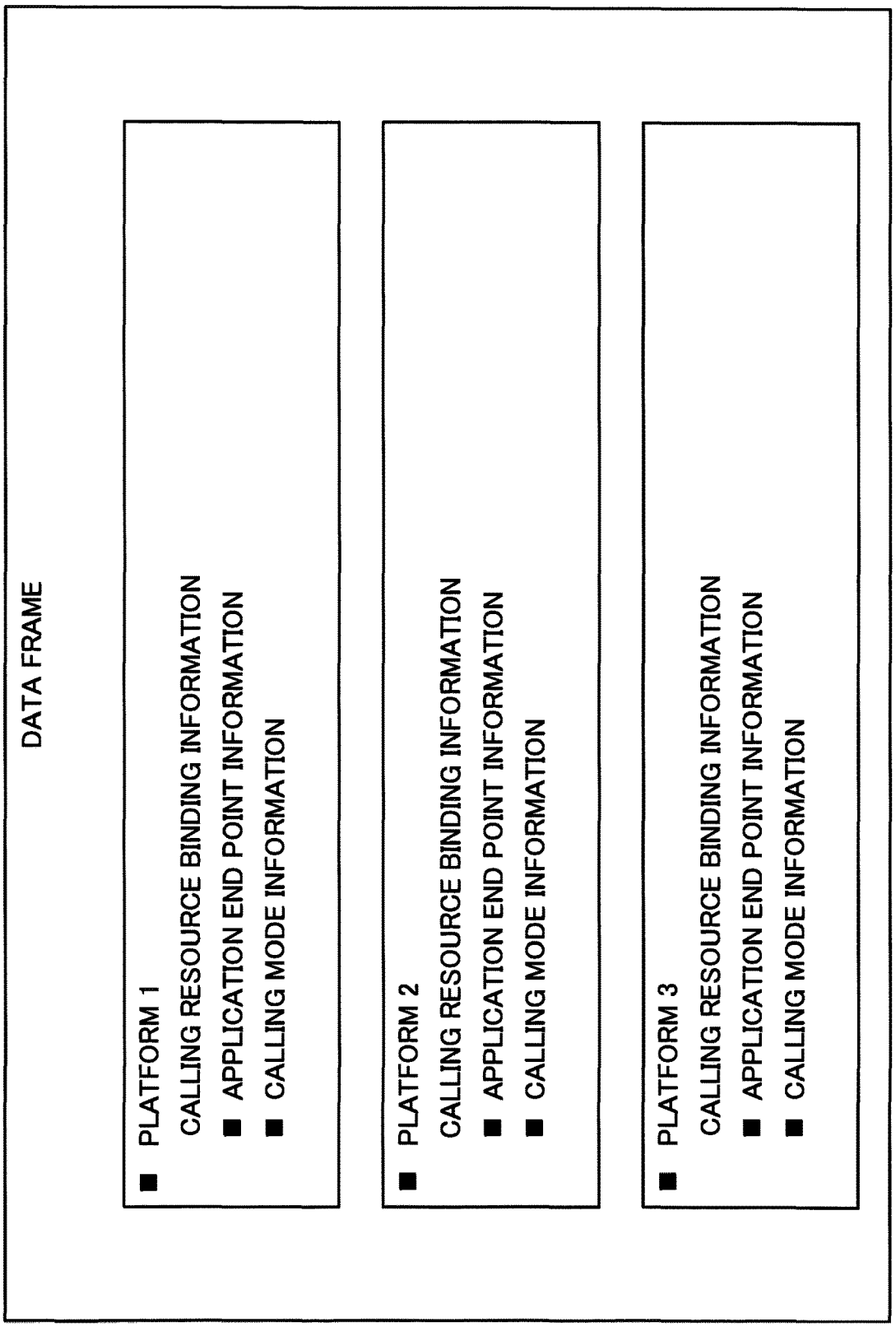
FIG. 19 is a diagram illustrating an example of information set in a data frame of a beacon according to the fourth embodiment.

Note that in the fourth embodiment, the information setting unit 24 sets information as illustrated in FIG. 19, for example, in the data frame of a beacon.

FIG. 19 is a diagram illustrating an example of information set in a data frame of a beacon according to the fourth embodiment. FIG. 19 illustrates an example in which calling resource binding information (calling mode information and application end point information) for each of the one or more platforms, is included in a single data frame.

Figure 20:
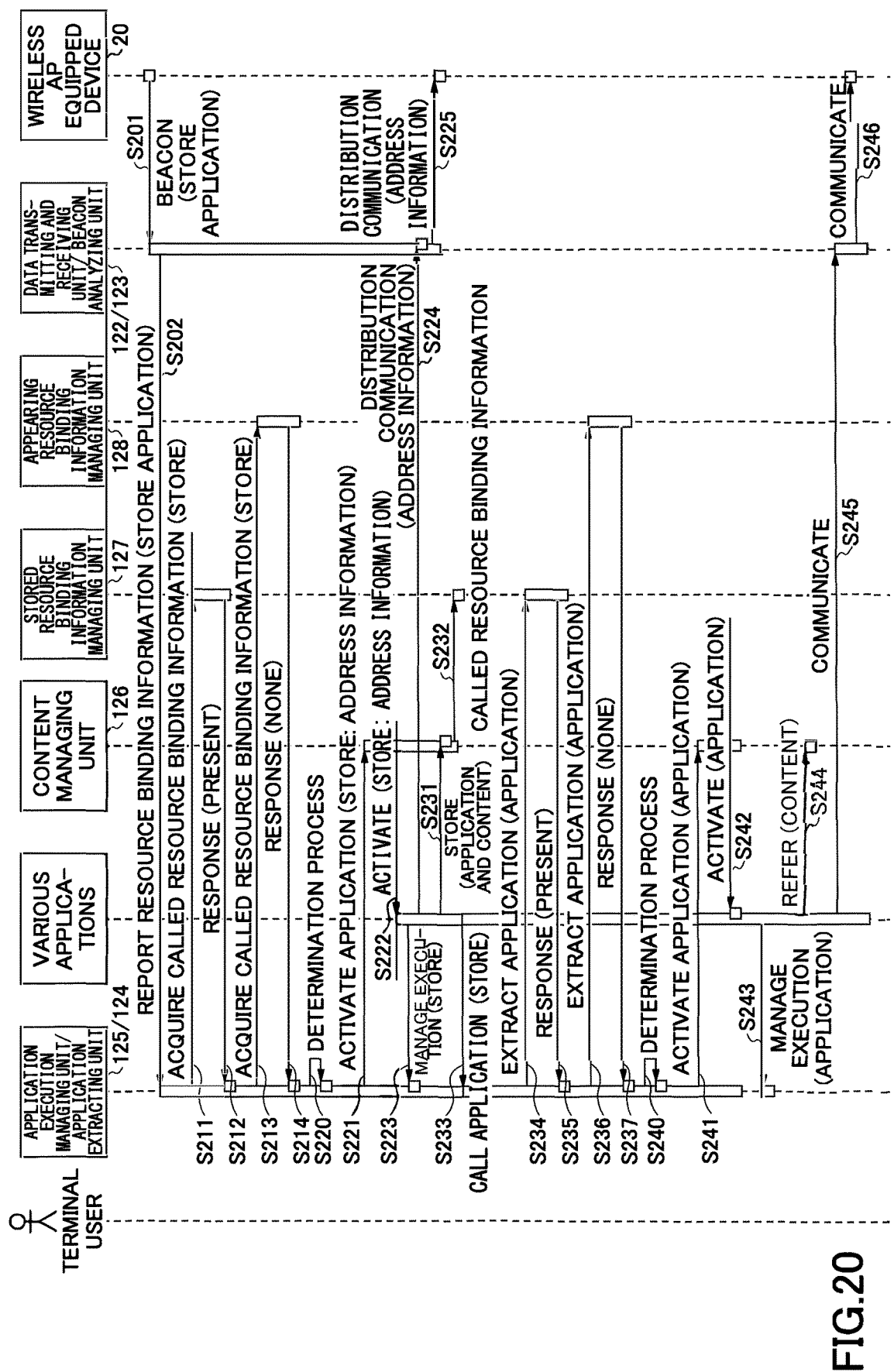
FIG. 20 is a sequence diagram for describing an example of a processing procedure according to the fourth embodiment.

FIG. 20 is a sequence diagram for describing an example of a processing procedure according to the fourth embodiment.

When the data transmitting and receiving unit 122 of the smart terminal 10 receives a beacon from the wireless AP equipped device 20 (step S201), the beacon analyzing unit 123 extracts the information corresponding to the platform of the smart terminal 10, from among the information set in the data frame of the received beacon.

Figure 21:
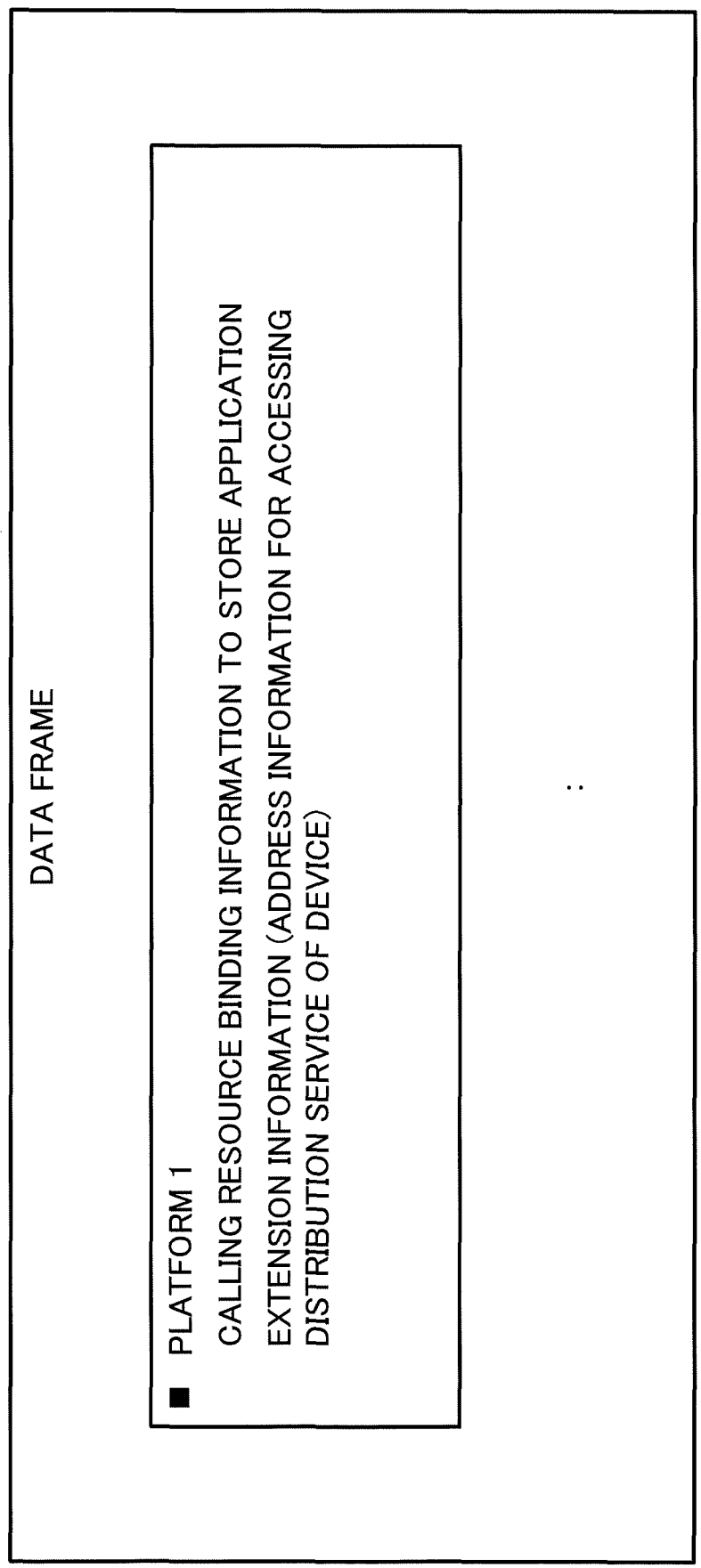
FIG. 21 is a diagram illustrating an example of a data frame of a beacon according to the fourth embodiment.

FIG. 21 is a diagram illustrating an example of a data frame of a beacon according to the fourth embodiment. As illustrated in FIG. 21, in the fourth embodiment, calling resource binding information with respect to a store application and extension information are included in a data frame in a format conforming to the format illustrated in FIG. 19. The extension information is information to be transferred to the store application. In FIG. 21, address information for accessing the distribution service provided by the data distributing unit 25 of the wireless AP equipped device 20 is indicated as an example of extension information.

When the extracted information is calling resource binding information, the beacon analyzing unit 123 reports the calling resource binding information to the application execution managing unit 125, and not to the appearing resource binding information managing unit 128 (step S202). Here, the extension information is also reported. The application execution managing unit 125 reports the calling resource binding information and the extension information to the application extracting unit 124.

Note that the beacon analyzing unit 123 does not have to execute step S202 when the data transmitting and receiving unit 122 receives the same beacon as the beacon from which the calling resource binding information has already been extracted. Accordingly, it is possible to avoid execution of step S202 and subsequent steps every time a beacon is received. The identity of the beacon may be determined based on the device ID, etc., included in the beacon.

Upon receiving the report of the calling resource binding information and the extension information, the application extracting unit 124 executes the same processing procedure as steps S116 to S130 of FIG. 10, in steps S211 to S220. However, the parameters specified in each step are different from those in FIG. 10. That is, in this case, acquisition of the called resource binding information corresponding to the calling resource binding information for the store application is executed. Here, the store application has already been installed in the smart terminal 10. On the other hand, a beacon including called resource binding information for the store application has not been received. Therefore, the corresponding called resource binding information is acquired only from the stored resource binding information managing unit 127. As a result, the application extracting unit 124 determines that an application (store application) corresponding to the calling resource binding information is installed in the smart terminal 10.

Subsequently, in steps S221 to S223, the same processing procedure as steps S141 to S143 of FIG. 10 is executed. However, the parameters specified in each step are different from those in FIG. 10. That is, in this case, calling resource binding information for the store application and extension information (address information) are specified. As a result, the store application is activated. When activating the store application, the application execution managing unit 125 reports the address information with respect to the distribution service of the wireless AP equipped device 20, to the store application. Note that to the user, it appears as if the store application is activated as a result of entering a certain area, despite the fact that no particular operation has been performed on the smart terminal 10.

The store application can communicate with the data distributing unit 25 of the wireless AP equipped device 20 that is the transmission source of the beacon, and can receive distribution of the device-specific application corresponding to the wireless AP equipped device 20 (steps S224 and S225). Note that the address information that is the extension information may include identification information of an application to be distributed. In this case, the application corresponding to the address information is downloaded.

The store application reports the distributed device-specific application to the content managing unit 126 (step S231). The content managing unit 126 executes the installation of the device-specific application. In the process of the installation, the content managing unit 126 reports the called resource binding information for the device-specific application attached to the device-specific application, to the stored resource binding information managing unit 127 (step S232). The stored resource binding information managing unit 127 stores the called resource binding information, for example, in the secondary storage device 103.

Subsequently, when the store application transmits calling resource binding information for the device-specific application (step S233), the same processing procedure as steps S116 to S145 in FIG. 10 is executed in steps S234 to S246. However, what is activated here is a device-specific application corresponding to the calling resource binding information. Here, the device-specific application is installed in the smart terminal 10. On the other hand, a beacon including the called resource binding information for the device-specific application is not received. Therefore, the called resource binding information corresponding to the calling resource binding information is acquired only from the stored resource binding information managing unit 127. As a result, the application extracting unit 124 determines that an application corresponding to the calling resource binding information (the device-specific application) is installed in the smart terminal 10.

Furthermore, step S244 indicates a process in which the device-specific application refers to the content related to the device-specific application itself, according to need. The content is registered in the content managing unit 126, for example, as the device-specific application is installed.

Note that the store application may compare the version number of the application or content managed by the data distributing unit 25 of the wireless AP equipped device 20 with the version number of the application or content managed by the content managing unit 126, and in the case where the version numbers are different, the store application may receive distribution of an application or content. As a result, the user can use the latest application or content.

As described above, according to the fourth embodiment, it is possible to use the wireless AP equipped device 20 via the smart terminal 10 as a result of the smart terminal 10 entering a reachable range of wireless radio waves of the wireless AP equipped device 20, without the user performing a particular operation on the smart terminal 10.

Next, a fifth embodiment will be described. In the fifth embodiment, the points different from the fourth embodiment will be described. In the fifth embodiment, the points not mentioned in particular may be the same as those in the fourth embodiment.

Figure 22:
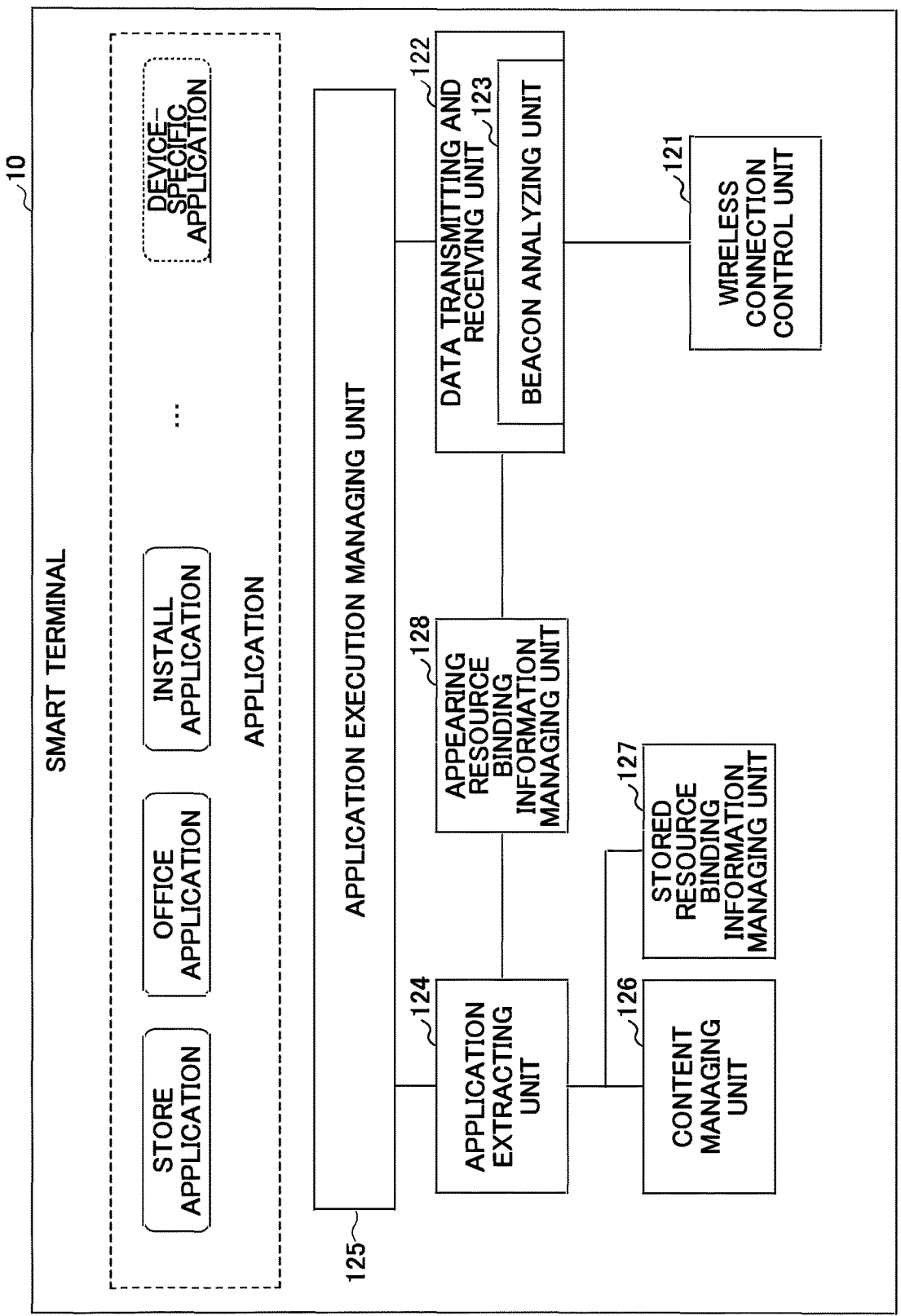
FIG. 22 is a diagram illustrating a functional configuration example of the smart terminal according to a fifth embodiment.

FIG. 22 is a diagram illustrating a functional configuration example of the smart terminal according to the fifth embodiment. In FIG. 22, the smart terminal 10 includes an install application. The install application is an application having privileges needed for installing a program in the smart terminal 10. In the present embodiment, a device driver, which is for making it possible to connect the detected wireless AP equipped device 20 and the smart terminal 10 with a USB 3.0 code cable, is the installation target.

On the other hand, in the fifth embodiment, the data distributing unit 25 of the wireless AP equipped device 20 distributes the device driver. That is, the distribution application storage unit 26 of the wireless AP equipped device 20 stores the corresponding device application.

Figure 23:
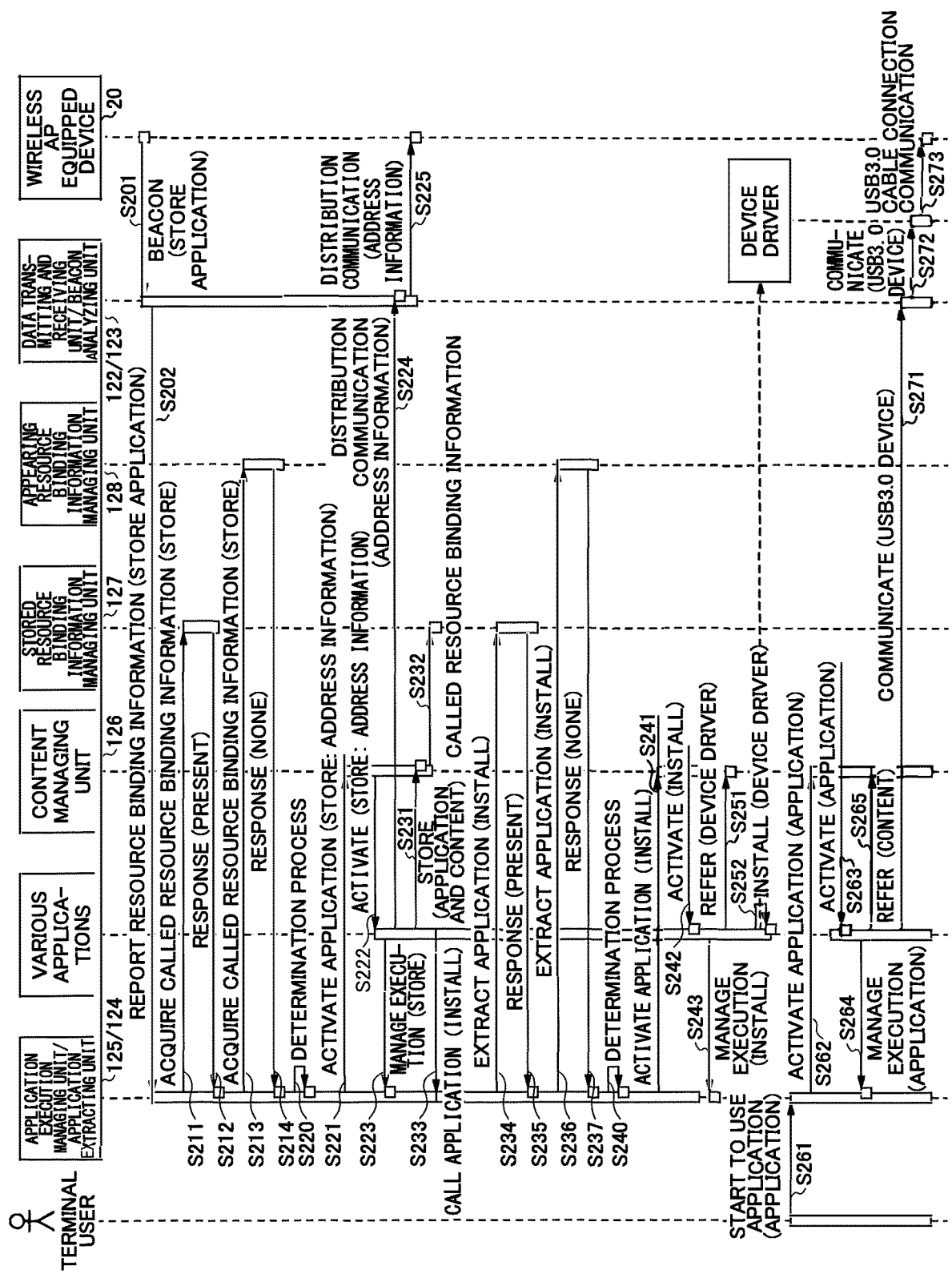
FIG. 23 is a sequence diagram for describing an example of a processing procedure according to the fifth embodiment.

FIG. 23 is a sequence diagram for describing an example of a processing procedure according to the fifth embodiment. In FIG. 23, steps that are the same as or corresponding to those in FIG. 20 are denoted by the same step numbers, and descriptions thereof are omitted.

Figure 24:
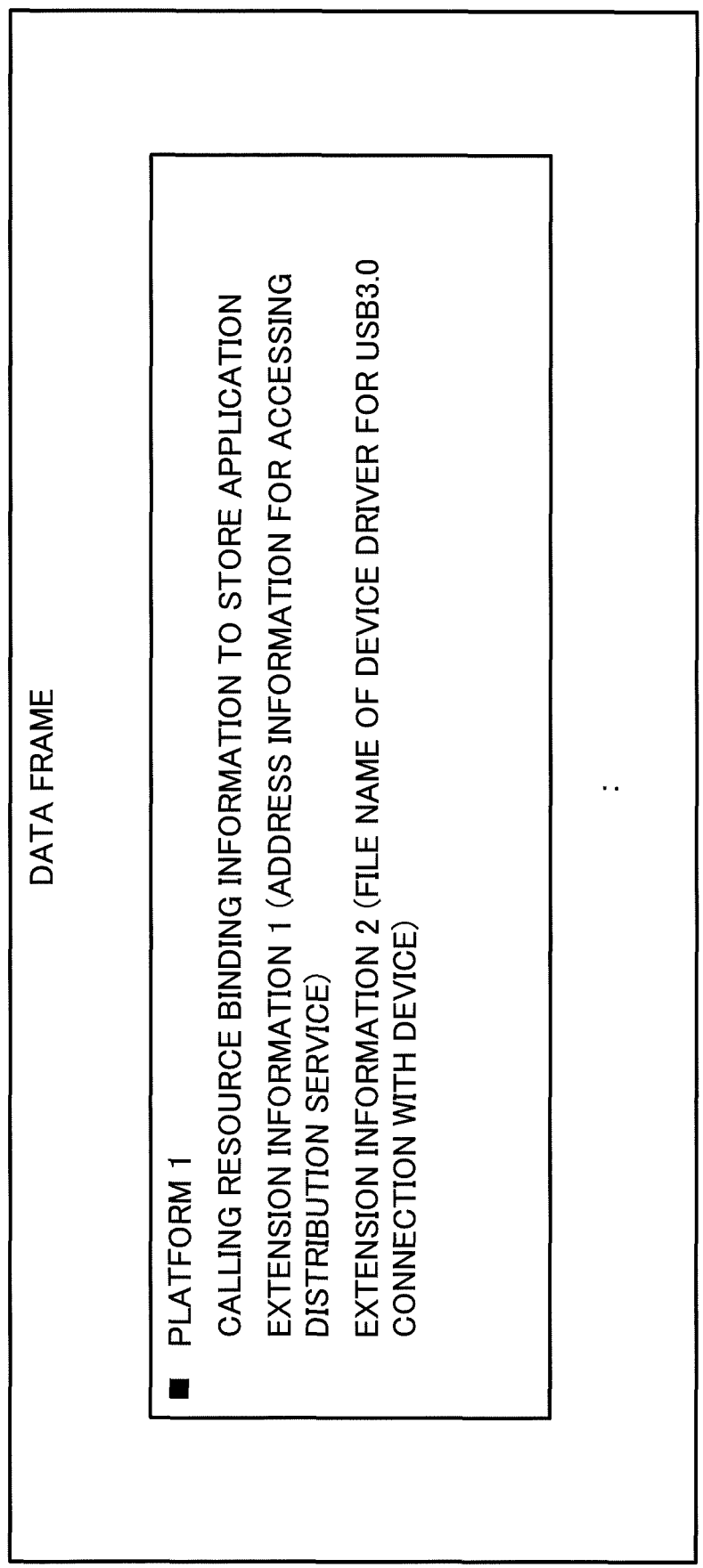
FIG. 24 is a diagram illustrating an example of a data frame of a beacon according to the fifth embodiment.

In FIG. 23, in step S201, a beacon including a data frame as illustrated in FIG. 24 is received.

FIG. 24 is a diagram illustrating an example of a data frame of a beacon according to the fifth embodiment. As illustrated in FIG. 24, in the fourth embodiment, calling resource binding information for a store application and extension information are included in a format conforming to the format illustrated in FIG. 19. As extension information, in addition to address information for accessing the distribution service provided by the data distributing unit 25, a file name of a device driver for connecting the wireless AP equipped device 20 that is the transmission source of the beacon with USB 3.0, is included.

Following step S201, steps S202 to S243 are executed. In the fifth embodiment, the data distributing unit 25 of the wireless AP equipped device 20 distributes the device driver relevant to the file name indicated in the extension information of FIG. 24.

The store application compares the version number of the device driver managed by the data distributing unit 25 of the wireless AP equipped device 20 with the version number of the device driver managed by the content managing unit 126, and in the case where the version numbers are different, distribution of an application or content may be received. As a result, the user can use the latest application or content.

Furthermore, in step S233, the store application transmits calling resource binding information for the install application. As a result, in steps S234 to S243, the install application is activated.

Upon activation, the install application refers to the file of the device driver managed by the content managing unit 126 and executes installation of the device driver (steps S251 and S252). Note that before installing the device driver, the install application may ask the user for permission to install the device driver.

Subsequently, after the user connects the smart terminal 10 and the wireless AP equipped device 20 with the USB 3.0 cable, the user inputs, to the smart terminal 10, an instruction to start using a certain application (hereinafter referred to as "target application") that uses the wireless AP equipped device 20. As a result, in steps S262 to S264, the same processing procedure as steps S112 to S114 of FIG. 10 is executed, and the target application is activated. Note that in response to activation, the target application may refer to the content related to the target application (step S265).

When the target application communicates with the wireless AP equipped device 20, the device driver is used via the data transmitting and receiving unit 122 (steps S271 to S273). That is, the communication is executed via the USB 3.0 cable. As a result, it becomes possible to use the wireless AP equipped device 20 via a wired network with stable performance. Note that another example where it is needed to install a device driver is FPGA (field-programmable gate array) or a GPU (Graphics Processing Unit) device, etc.

As described above, according to the fifth embodiment, the same effects as those of the fourth embodiment can be obtained with respect to the device driver.

Next, a sixth embodiment will be described. In the sixth embodiment, the points different from the fourth embodiment will be described. In the sixth embodiment, the points not particularly mentioned may be the same as those in the fourth embodiment.

Figure 25:
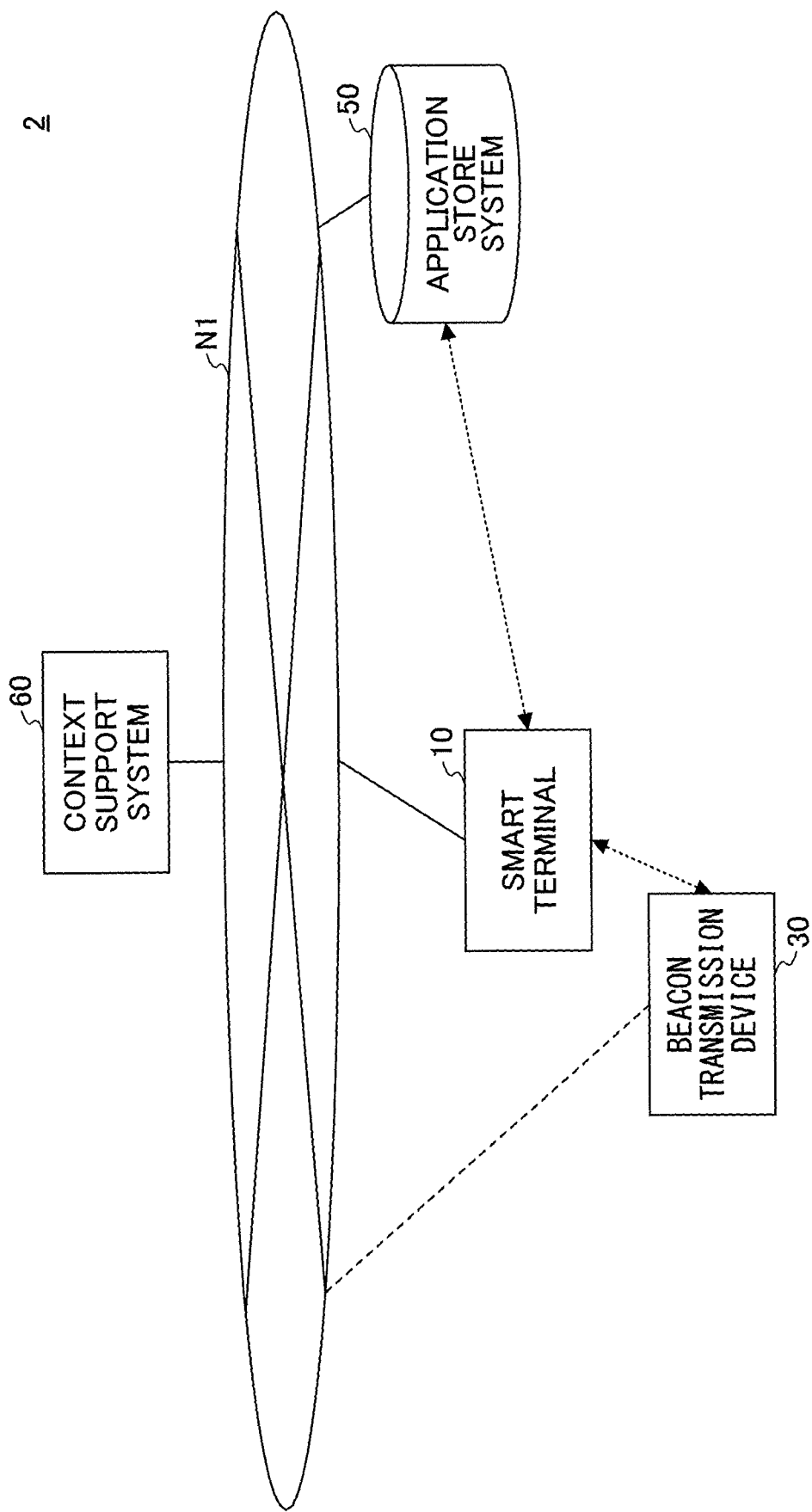
FIG. 25 is a diagram illustrating a configuration example of the information processing system according to a sixth embodiment.

FIG. 25 is a diagram illustrating a configuration example of the information processing system according to the sixth embodiment. In FIG. 25, the same elements as those in FIG. 3 are denoted by the same reference numerals, and descriptions thereof are omitted.

In FIG. 25, a context support system 60 is connected to the network N1. The context support system 60 is a computer system that provides a service (hereinafter referred to as "context support service") according to the context (status) of the smart terminal 10 or the user of the smart terminal 10. As an example of the context, the place and the time, etc., may be cited.

FIG. 25 also illustrates an example in which a beacon transmission device 30 is disposed instead of the wireless AP equipped device 20. The beacon transmission device 30 does not have an access point as in Wi-Fi (registered trademark), but the beacon transmission device 30 is a device that transmits beacons. For example, a BLE (Bluetooth (registered trademark) Low Energy) device may be cited as an example of a beacon transmission device. A device capable of other short-range wireless communication may be used as the beacon transmission device 30. Furthermore, the wireless AP equipped device 20 may be used as the beacon transmission device 30. Note that the beacon transmission device 30 is used to provide a context support service.

Figure 26:
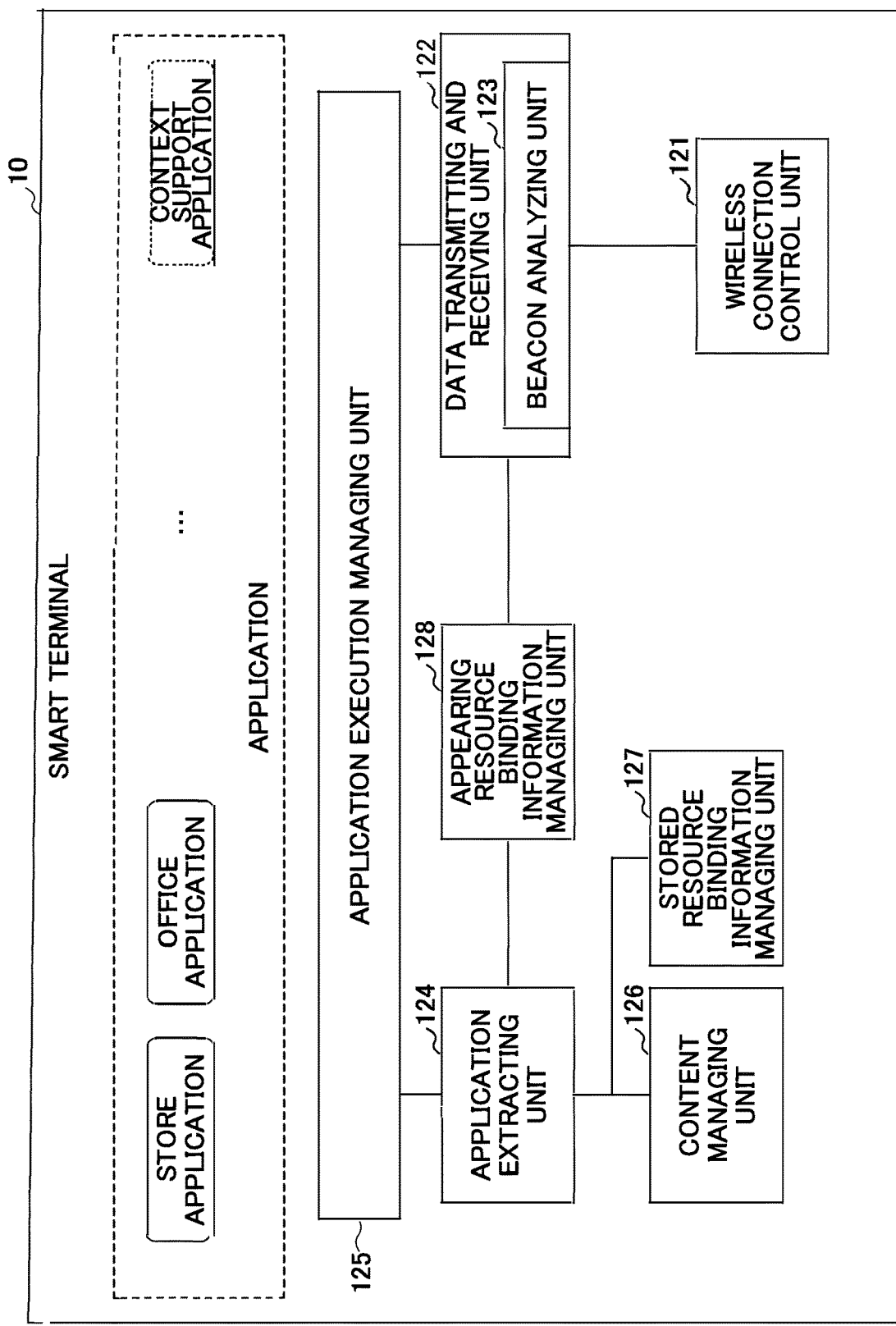
FIG. 26 is a diagram illustrating a functional configuration example of the smart terminal according to the sixth embodiment.

FIG. 26 is a diagram illustrating a functional configuration example of the smart terminal according to the sixth embodiment. In FIG. 26, the same elements as those in FIG. 5 are denoted by the same reference numerals, and descriptions thereof are omitted.

In FIG. 26, the smart terminal 10 includes a context support application. The context support application is an application that provides the context support system 60 to the user of the smart terminal 10 by communicating with the context support system 60. The context support application is, for example, an application distributed to the smart terminal 10 by the application store system 50.

Figure 27:
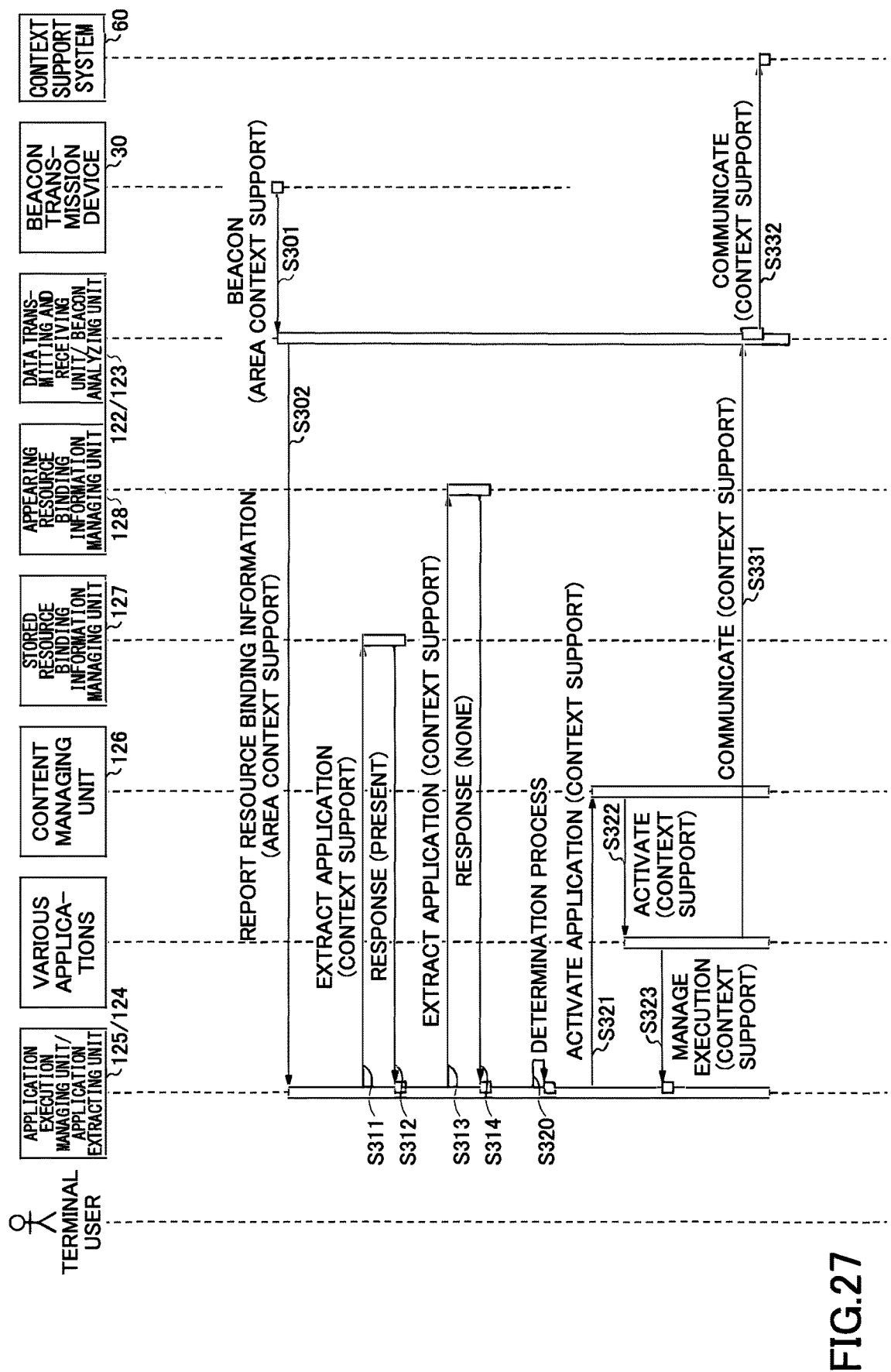
FIG. 27 is a sequence diagram for describing an example of the processing procedure according to the sixth embodiment.

FIG. 27 is a sequence diagram for describing an example of the processing procedure according to the sixth embodiment.

Steps S301 and S302 are the same as steps S201 and S202 of FIG. 20, except that the beacon transmission source is the beacon transmission device 30. That is, when the data transmitting and receiving unit 122 of the smart terminal 10 receives a beacon from the beacon transmission device 30 (step S301), the beacon analyzing unit 123 extracts information corresponding to the platform of the smart terminal 10, from among the information set in the data frame of the received beacon.

Figure 28:
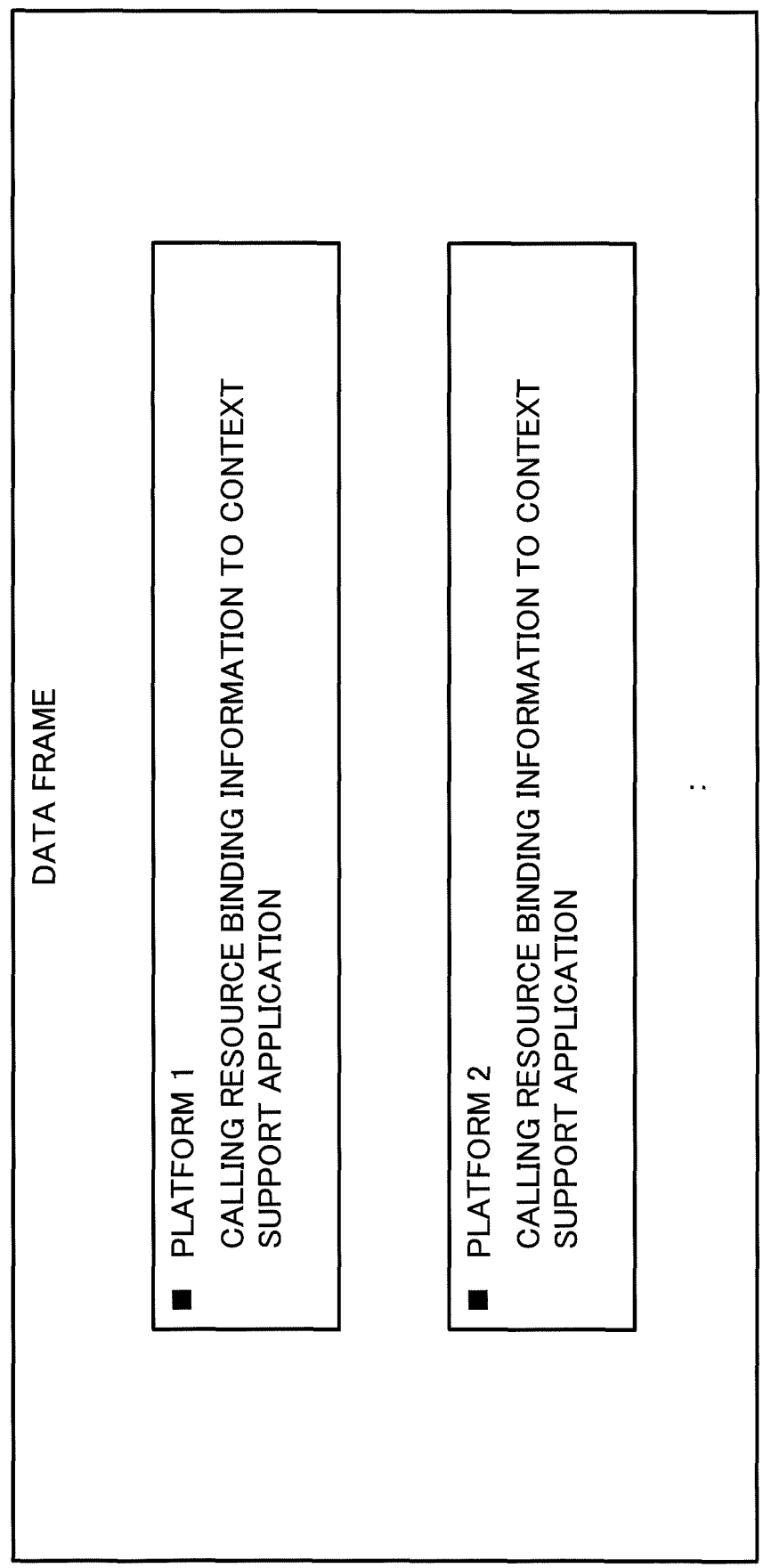
FIG. 28 is a diagram illustrating an example of a data frame of a beacon according to the sixth embodiment.

FIG. 28 is a diagram illustrating an example of a data frame of a beacon according to the sixth embodiment. As illustrated in FIG. 28, in the sixth embodiment, calling resource binding information for a context support application is included in a data frame for each platform.

The extracted information is calling resource binding information, and therefore the beacon analyzing unit 123 reports the calling resource binding information to the application execution managing unit 125 (step S302).

In the subsequent steps S311 to S323, the same processing procedure as the steps S211 to S223 of FIG. 20 is executed. As a result, the context support application is activated. Therefore, when the user approaches a certain beacon transmission device 30, it appears to the user as if the context support application is automatically activated. Note that the application execution managing unit 125 may ask the user for permission to activate the context support application.

Upon activation, the context support application executes communication with the context support system 60 via the data transmitting and receiving unit 122 (steps S331 and S332). At this time, the device ID of the beacon transmission device 30 may be reported to the context support system 60. Alternatively, identification information (area information) of the installation location of the beacon transmission device 30 may be included in the data frame of the beacon, and the area information may be reported to the context support system 60.

For example, the context support application downloads content suitable for the area from the context support system 60, via communication with the context support system 60, and displays the content. As an example, the beacon transmission device 30 may be installed in front of a shop, and content related to the shop may be displayed.

As described above, according to the sixth embodiment, by approaching near the beacon transmission device 30, it is possible to automatically provide a service suitable for the context of the user.

Next, a seventh embodiment will be described. In the seventh embodiment, the points different from the sixth embodiment will be described. In the seventh embodiment, the points not particularly mentioned may be the same as those in the sixth embodiment.

Figure 29:
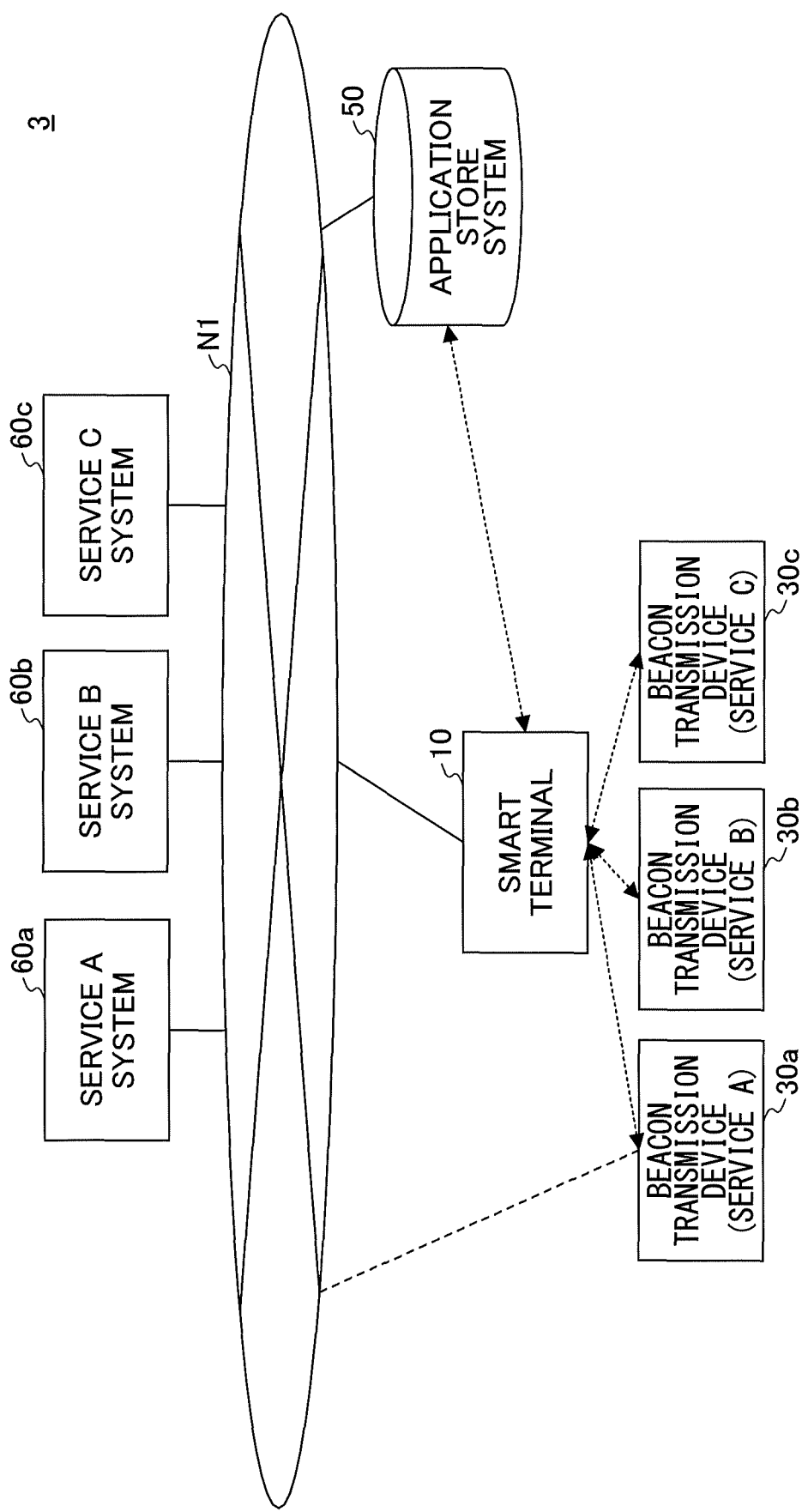
FIG. 29 is a diagram illustrating a configuration example of an information processing system according to a seventh embodiment.

FIG. 29 is a diagram illustrating a configuration example of an information processing system according to the seventh embodiment. In FIG. 29, the same elements as those in FIG. 25 are denoted by the same reference numerals, and descriptions thereof are omitted.

In FIG. 29, a service A system 60a, a service B system 60b, and a service C system 60c are connected to the network N1. The service A system 60a is a computer system that provides a service A. The service B system 60b is a computer system that provides a service B. The service C system 60c is a computer system that provides a service C. Note that the service A, the service B, and the service C, etc., may be services such as a context support service, for example.

FIG. 29 also illustrates an example in which the smart terminal 10 is located within the reachable range of beacons of a plurality of the beacon transmission devices 30. The beacon transmission devices 30a, 30b, and 30c are beacon transmission devices 30 corresponding to the service A, the service B, and the service C, in the stated order.

Figure 30:
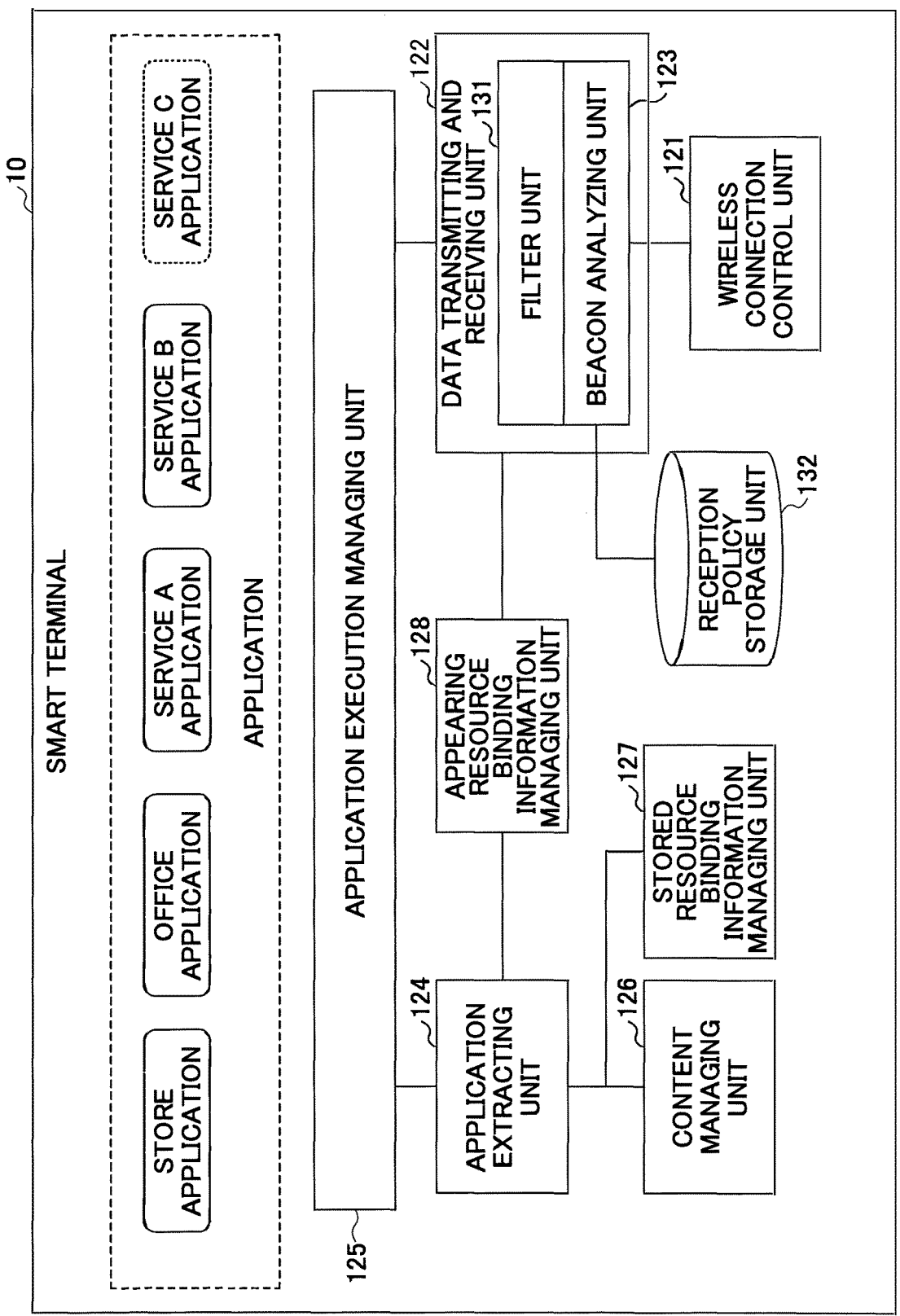
FIG. 30 is a diagram illustrating a functional configuration example of the smart terminal according to the seventh embodiment.

FIG. 30 is a diagram illustrating a functional configuration example of the smart terminal according to the seventh embodiment. In FIG. 30, the same elements as those in FIG. 26 are denoted by the same reference numerals, and descriptions thereof are omitted.

In FIG. 30, the smart terminal 10 further includes a filter unit 131 and a reception policy storage unit 132. The filter unit 131 is implemented by processes that the CPU 101 is caused to execute by programs installed in the smart terminal 10. The reception policy storage unit 132 can be implemented by using, for example, the secondary storage device 103, etc.

The filter unit 131 causes the beacon analyzing unit 123 to determine the validity of information reported to the application execution managing unit 125 or the appearing resource binding information managing unit 128, based on a reception policy stored in the reception policy storage unit 132. The reception policy is information indicating valid calling resource binding information in the smart terminal 10.

The smart terminal 10 also includes a service A application, a service B application, and a service C application. The service A application, the service B application, and the service C application are applications corresponding to the service A, the service B, and the service C, in the stated order.

Figure 31:
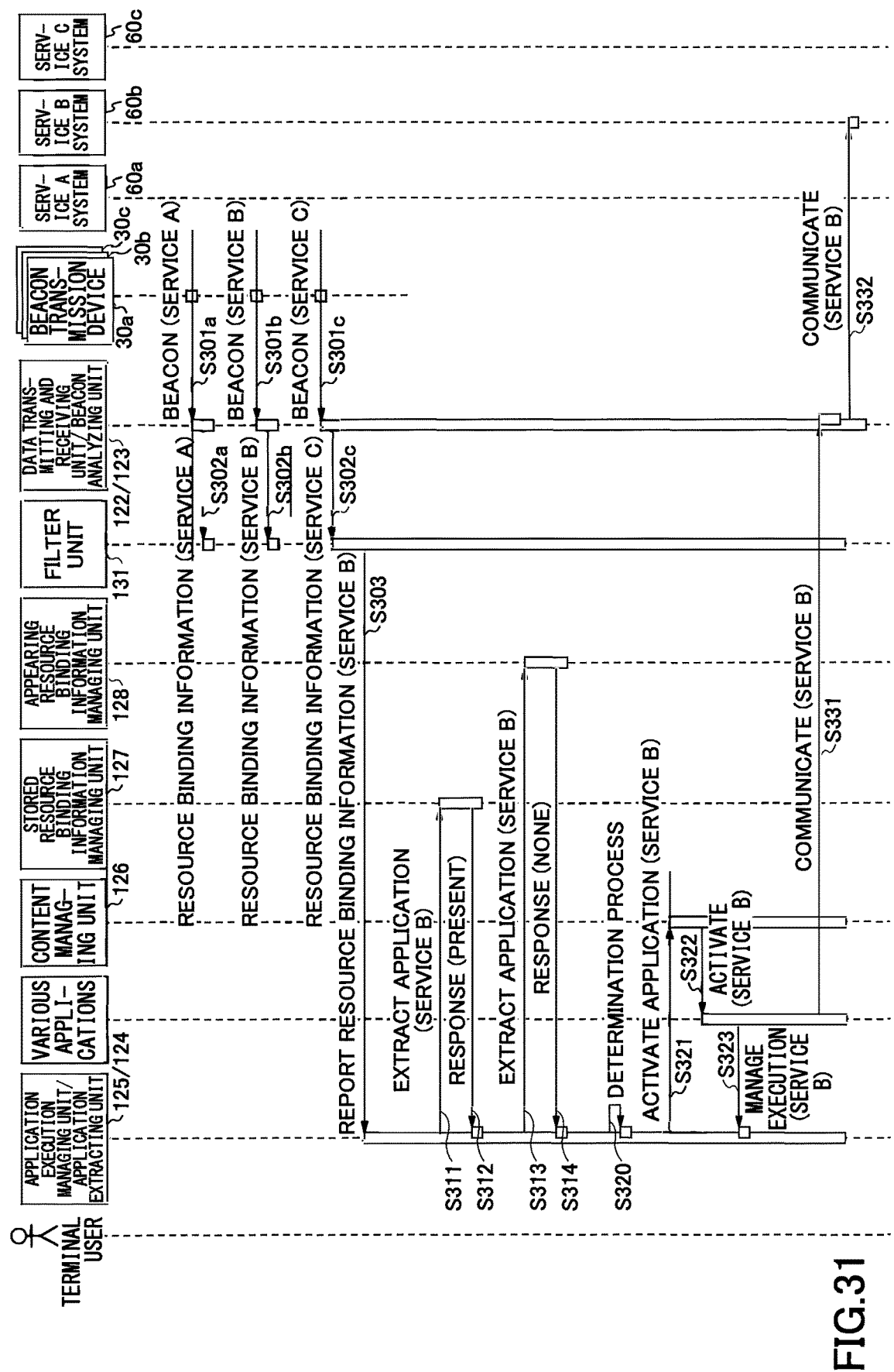
FIG. 31 is a sequence diagram for describing an example of a processing procedure according to the seventh embodiment.

FIG. 31 is a sequence diagram for describing an example of the processing procedure according to the seventh embodiment. In FIG. 31, the same step numbers are assigned to the steps same as or corresponding to those in FIG. 27, and descriptions thereof are omitted.

When the data transmitting and receiving unit 122 of the smart terminal 10 receives a beacon from each of the three beacon transmission devices 30 (steps S301a, S301b, and S301c), the beacon analyzing unit 123 extracts information corresponding to the platform of the smart terminal 10, from among the information set in the data frame of the received beacon. The beacon analyzing unit 123 reports the extracted information to the filter unit 131 (steps S302a, S302b, and S302c). Note that steps S301a, S301b, and S301c are not necessarily executed at the same time.

Figure 32A:
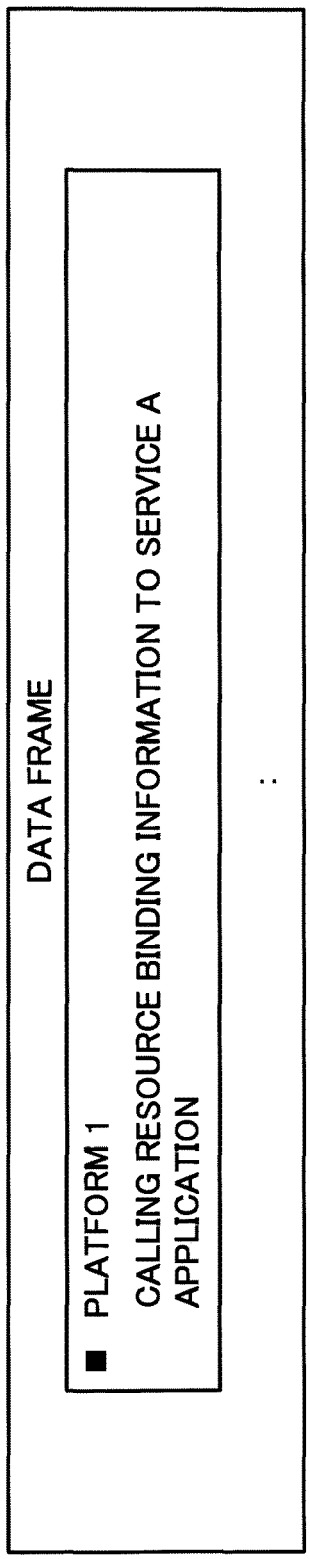
FIGS. 32A to 32C are diagrams illustrating examples of data frames of beacons according to the seventh embodiment.
Figure 32B:
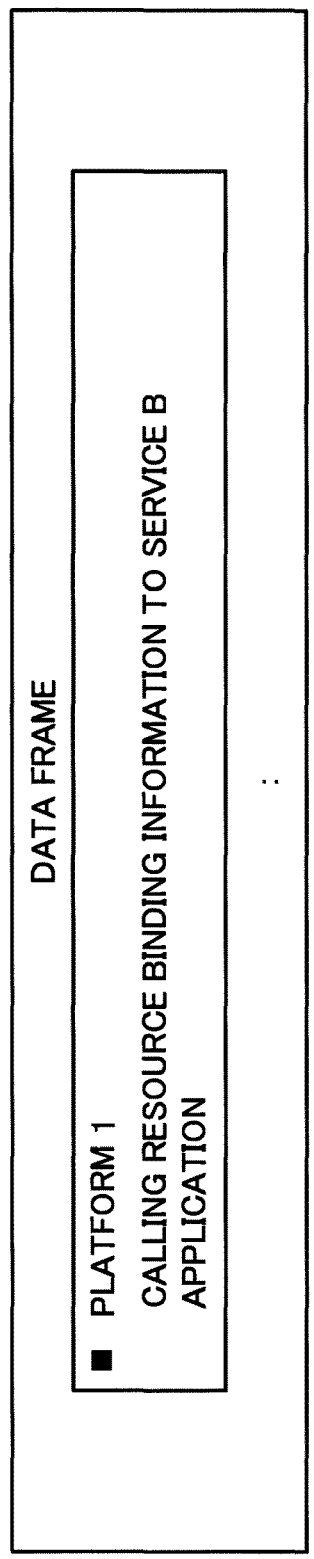
Figure 32C:
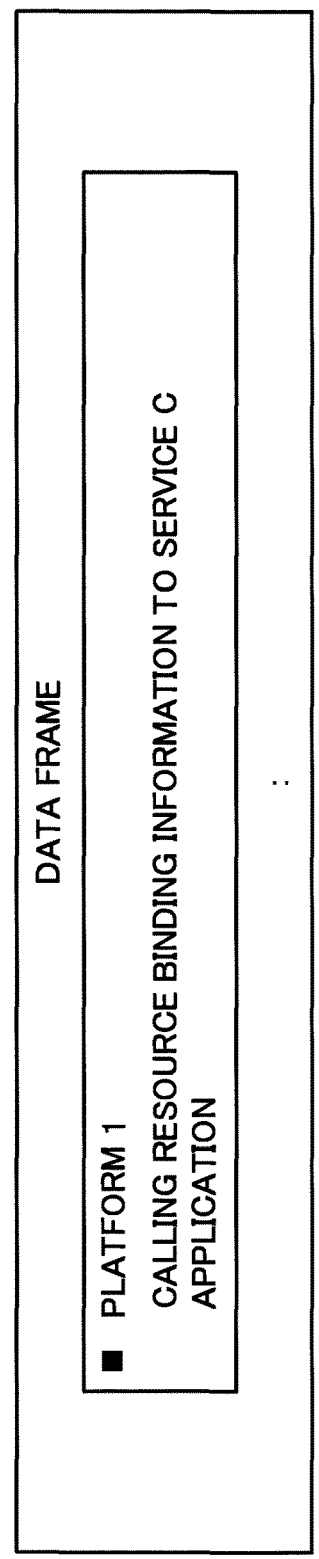

FIGS. 32A to 32C are diagrams illustrating examples of data frames of beacons according to the seventh embodiment. FIG. 32A illustrates the data frame of the beacon from the beacon transmission device 30a. In the data frame, calling resource binding information for the service A application is included. FIG. 32B illustrates the data frame of the beacon from the beacon transmission device 30b. The data frame includes calling resource binding information for the service B application. FIG. 32C illustrates the data frame of the beacon from the beacon transmission device 30c. The data frame includes calling resource binding information for the service C application.

Subsequently, the filter unit 131 matches the calling resource binding information reported from the beacon analyzing unit 123 to the reception policy stored in the reception policy storage unit 132, and determines the validity of the calling resource binding information.

FIGS. 33A to 33C are diagrams illustrating configuration examples of reception policies. Three examples are respectively illustrated in FIGS. 33A to 33C.

FIG. 33A illustrates an example of a reception policy corresponding to the case where filtering is performed in the reverse domain namespace. The reverse domain name is a method of applying name information of an application or a name used as the application end point information. For example, "jp.b-service.apps.contact" corresponds to the name in the namespace of "jp.b-service.apps" in the first record in FIG. 33A. "Com.b-service.apps.contact" corresponds to a name outside the namespace of "jp.b-service.apps" in the second record of FIG. 33A. In FIG. 33A, for any record, it is indicated that the name in the space of the reverse domain name is a reception target (valid). When a reception policy as in FIG. 33A is adopted, the name included in the calling resource binding information is matched to the reverse domain name to determine the validity of the calling resource binding information.

FIG. 33B is an example of a reception policy corresponding to a case where filtering is performed, by a regular expression for individual identification information relating to the beacon transmission device 30 that transmits beacons and identification information of a service to be provided, etc. A record, in which the item of "regular expression processing" indicates "valid", is used for filtering. When a reception policy as illustrated in FIG. 33B is adopted, the identification information included in the calling resource binding information is matched to the regular expression to determine the validity of the calling resource binding information.

FIG. 33C is an example of a reception policy corresponding to a case where filtering is performed by combining the reception policy of FIG. 33A and the reception policy of FIG. 33B. The first record of FIG. 33C indicates that the first record of FIG. 33A and the first record of FIG. 33B are combined by logical multiplication. In this case, when "to be received" is determined for both records, "to be received" is the determination made. On the other hand, the second record of FIG. 33C illustrates that the second record of FIG. 33A and the second record of FIG. 33B are combined by logical addition. In this case, when it is determined for at least one of the records as "to be received", it is determined as "valid".

Note that the configuration of the reception policy is not limited to the examples illustrated in FIGS. 33A to 33C. For example, filtering may be performed by determining whether the smart terminal 10 is in a sleep state, or determining whether the smart terminal 10 is located inside or outside a virtual geographical boundary line referred to as a geofence, or by using the priority levels of these determinations.

The filter unit 131 reports the calling resource binding information determined as valid based on the reception policy filter, to the application execution managing unit 125 (step S303).

The steps from and beyond step S311 are executed with respect to the calling resource binding information. FIG. 31 illustrates an example in which the calling resource binding information for the service B application is received. Therefore, the service B application is activated and the service B is provided to the user.

As described above, according to the seventh embodiment, even when a plurality of beacons are received, by filtering the calling resource binding information included in the beacon based on the reception policy, it is possible to automatically provide a service according to the user's intention.

Figure 34:
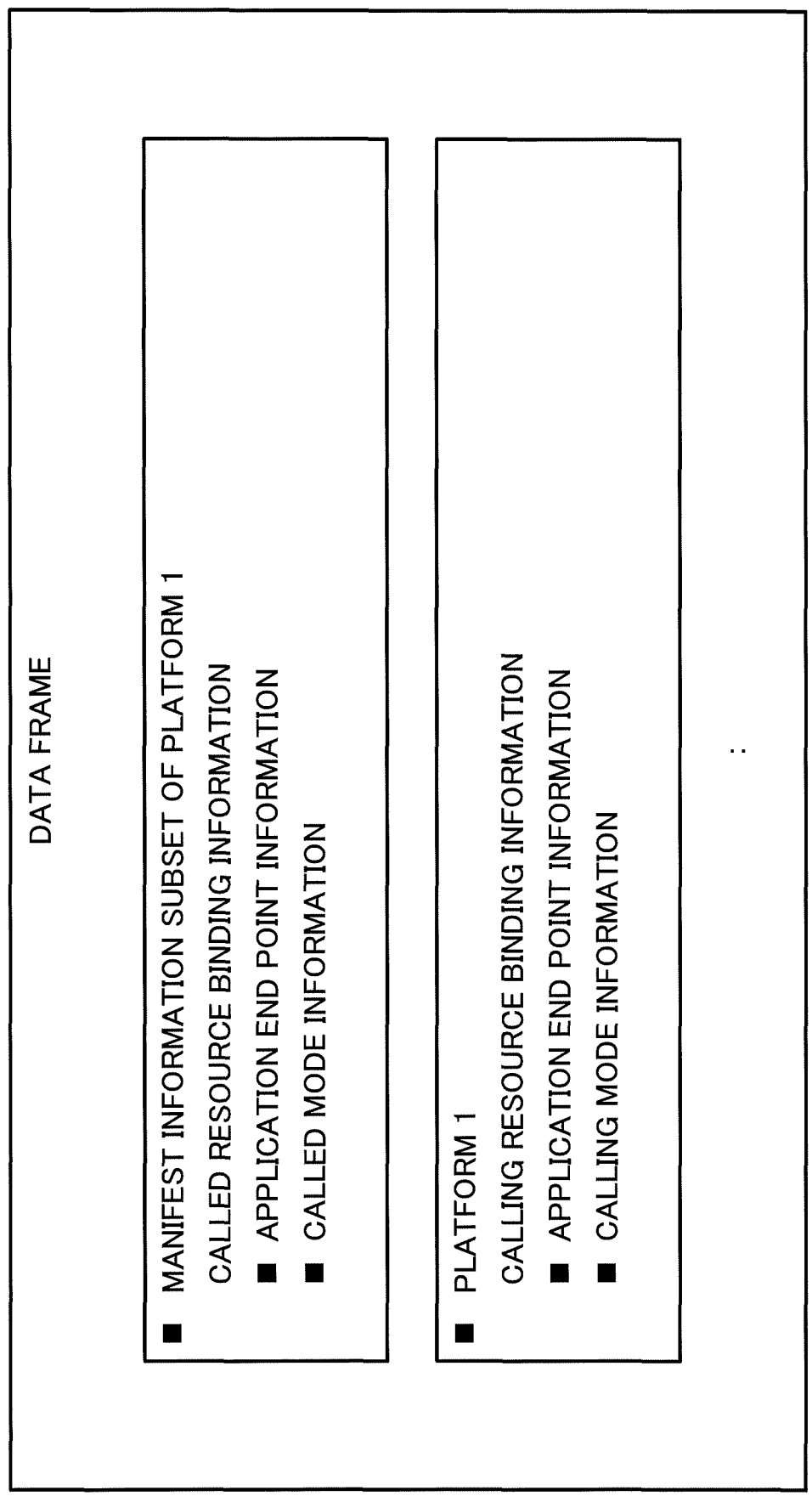
FIG. 34 is a diagram illustrating another example of information set in the data frame of a beacon.

Note that in each of the above embodiments, information as illustrated in FIG. 34, for example, may be set in the data frame of the beacon.

FIG. 34 is a diagram illustrating another example of information set in the data frame of a beacon. FIG. 34 illustrates an example in which called resource binding information (corresponding to the called mode information and application end point information of the subset of manifest information) and calling resource binding information (corresponding to the calling mode information and application end point information) are included for each platform in a single data frame. When a beacon including such a data frame is received, the beacon analyzing unit 123 or the filter unit 131 reports the calling resource binding information to the application execution managing unit 125 and reports the called resource binding information to the appearing resource binding information managing unit 128.

Note that among the above embodiments, two or more embodiments may be combined and implemented.

In addition, a program other than an application may be applied to each of the above-described embodiments.

According to an aspect of the embodiments, it is possible to suppress the distribution of unnecessary content to a terminal, based on a beacon.

Note that in the above embodiments, the called resource binding information is an example of called condition information. The beacon analyzing unit 123 is an example of an extracting unit. The application execution managing unit 125 is an example of a calling unit. The content managing unit 126 is an example of an acquiring unit. The safety resource binding information managing unit 130 is an example of a storing unit. The application extracting unit 124 is an example of a selecting unit. The filter unit 131 is an example of a determining unit. The calling resource binding information is an example of calling target information.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus capable of performing wireless communication, the information processing apparatus comprising:
    a processor configured to execute one or more processes including
        receiving a beacon from a wireless access point device via wireless communication, the beacon including a data frame in which called resource binding information, including identification information of a first program exclusively used for and configured to control the wireless access point device, is set,
        extracting, from the data frame of the received beacon, the called resource binding information, the extracted called resource binding information indicating a condition by which the first program is called, and
        calling the first program in response to determining that a process, which the information processing apparatus is caused to execute by a second program, satisfies the condition indicated by the extracted called resource binding information,
    wherein
        the calling includes stopping the first program in response to determining that the beacon is no longer received, and
        the second program causes the information processing apparatus to execute communication with the wireless access device via the wireless communication, and the one or more processes further include,
        storing identification information of the wireless access device and the called resource binding information in association with each other in a storage, in response to a predetermined operation being input by a user,
        selecting the called resource binding information stored in the storage in association with the identification information, from among a plurality of pieces of called resource binding information respectively extracted from a plurality of beacons, when the plurality of the beacons are being received,
        the calling includes calling the first program corresponding to the selected called resource binding information.

2. The information processing apparatus according to claim 1, wherein the one or more processes further include acquiring the first program via a network in response to determining that the information processing apparatus does not include the first program, when the process, which the information processing apparatus is caused to execute by the second program, satisfies the condition indicated by the called resource binding information.

3. The information processing apparatus according to claim 1, wherein the calling includes calling a target program in response to the extracting, from the received beacon, calling target information indicating the target program to be called.

4. The information processing apparatus according to claim 3, wherein the one or more processes further include
    determining validity of the extracted calling target information, by referring to information indicating valid calling target information in the information processing apparatus, wherein
    the calling includes calling a target program relating to the calling target information that is determined to be valid.

5. An information processing system comprising:
    an information processing apparatus capable of performing wireless communication; and
    a device,
    wherein the information processing apparatus includes a processor configured to execute one or more processes including
        receiving a beacon from a wireless access point device via wireless communication, the beacon including a data frame in which called resource binding information, including identification information of a first program exclusively used for and configured to control the wireless access point device, is set,
        extracting, from the data frame of the received beacon, the called resource binding information, the extracted called resource binding information indicating a condition by which the first program is called, and
        calling the first program in response to determining that a process, which the information processing apparatus is caused to execute by a second program, satisfies the condition indicated by the extracted called resource binding information,
    wherein
        the calling includes stopping the first program in response to determining that the beacon is no longer received, and
        the second program causes the information processing apparatus to execute communication with the wireless access device via the wireless communication, and the one or more processes further include,
        storing identification information of the wireless access device and the called resource binding information in association with each other in a storage, in response to a predetermined operation being input by a user,
        selecting the called resource binding information stored in the storage in association with the identification information, from among a plurality of pieces of called resource binding information respectively extracted from a plurality of beacons, when the plurality of the beacons are being received, and
        the calling includes calling the first program corresponding to the selected called resource binding information.

6. An information processing method executed by a computer in an information processing apparatus capable of performing wireless communication, the information processing method comprising:
- receiving a beacon from a wireless access point device via wireless communication, the beacon including a data frame in which called resource binding information, including identification information of a first program exclusively used for and configured to control the wireless access point device, is set;
- extracting, from the data frame of the received beacon, the called resource binding information, the extracted called resource binding information indicating a condition by which the first program is called; and
- calling the first program in response to determining that a process, which the information processing apparatus is caused to execute by a second program, satisfies the condition indicated by the extracted called resource binding information,
- wherein
  - the calling includes stopping the first program in response to determining that the beacon is no longer received, and
  - the second program causes the information processing apparatus to execute communication with the wireless access device via the wireless communication, and the information processing method further includes,
    - storing identification information of the wireless access device and the called resource binding information in association with each other in a storage, in response to a predetermined operation being input by a user,
    - selecting the called resource binding information stored in the storage in association with the identification information, from among a plurality of pieces of called resource binding information respectively extracted from a plurality of beacons, when the plurality of the beacons are being received, and
    - the calling includes calling the first program corresponding to the selected called resource binding information.

7. The information processing method according to claim 6, further comprising:
- acquiring the first program via a network in response to determining that the information processing apparatus does not include the first program, when the process, which the information processing apparatus is caused to execute by the second program, satisfies the condition indicated by the called resource binding information.

8. The information processing method according to claim 6, wherein the calling includes calling a target program in response to the extracting, from the received beacon, calling target information indicating the target program to be called.

9. The information processing method according to claim 8, further comprising:
- determining validity of the extracted calling target information, by referring to information indicating valid calling target information in the information processing apparatus, wherein
- the calling includes calling a target program relating to the calling target information that is determined to be valid.

10. A non-transitory computer-readable recording medium storing an information processing program that causes a computer to execute one or more processes performed in an information processing apparatus, the one or more processes comprising:
- receiving a beacon from a wireless access point device via wireless communication, the beacon including a data frame in which called resource binding information, including identification information of a first program exclusively used for and configured to control the wireless access point device, is set;
- extracting, from the date frame of the received beacon, the called resource binding information, the extracted called resource binding information indicating a condition by which the first program is called; and
- calling the first program in response to determining that a process, which the information processing apparatus is caused to execute by a second program, satisfies the condition indicated by the extracted called resource binding information,
- wherein
  - the calling includes stopping the first program in response to determining that the beacon is no longer received, and
  - the second program causes the information processing apparatus to execute communication with the wireless access device via the wireless communication, and the one or more processes further include,
    - storing identification information of the wireless access device and the called resource binding information in association with each other in a storage, in response to a predetermined operation being input by a user,
    - selecting the called resource binding information stored in the storage in association with the identification information, from among a plurality of pieces of called resource binding information respectively extracted from a plurality of beacons, when the plurality of the beacons are being received, and
  - the calling includes calling the first program corresponding to the selected called resource binding information.

11. The non-transitory computer-readable recording medium according to claim 10, the one or more processes further comprising:
- acquiring the first program via a network in response to determining that the information processing apparatus does not include the first program, when the process, which the information processing apparatus is caused to execute by the second program, satisfies the condition indicated by the called resource binding information.

12. The non-transitory computer-readable recording medium according to claim 10, wherein the calling includes calling a target program in response to the extracting, from the received beacon, calling target information indicating the target program to be called.

13. The non-transitory computer-readable recording medium according to claim 12, the one or more processes further comprising:
- determining validity of the extracted calling target information, by referring to information indicating valid calling target information in the information processing apparatus, wherein
- the calling includes calling a target program relating to the calling target information that is determined to be valid.

* * * * *